(12) United States Patent
Satou

(10) Patent No.: US 7,554,614 B2
(45) Date of Patent: Jun. 30, 2009

(54) REMOTE CONTROL SYSTEM

(75) Inventor: Tetsuya Satou, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/282,024

(22) PCT Filed: Dec. 7, 2007

(86) PCT No.: PCT/JP2007/073665

§ 371 (c)(1),
(2), (4) Date: Sep. 8, 2008

(87) PCT Pub. No.: WO2008/069304

PCT Pub. Date: Jun. 12, 2008

(65) Prior Publication Data

US 2009/0051824 A1 Feb. 26, 2009

(30) Foreign Application Priority Data

Dec. 8, 2006 (JP) ............................. 2006-332518
Mar. 6, 2007 (JP) ............................. 2007-056444

(51) Int. Cl.
*H04N 5/44* (2006.01)
*H04N 5/268* (2006.01)

(52) U.S. Cl. ..................... 348/734; 348/706

(58) Field of Classification Search ............. 348/734, 348/569, 705, 706, 552; 725/38, 153; 710/8, 710/11, 15–19, 62–64, 105, 106; 340/825.69, 340/825.71, 825.72; 386/83
See application file for complete search history.

(56) References Cited

U.S. PATENT DOCUMENTS 5,371,553 A 12/1994 Kawamura et al.
5,574,965 A * 11/1996 Welmer ...................... 725/151
5,608,730 A * 3/1997 Osakabe et al. ............. 370/471
5,991,842 A * 11/1999 Takayama ................... 710/105
6,813,659 B1 11/2004 Osakabe et al.
6,912,016 B2 * 6/2005 Stumm ....................... 348/705

(Continued)

FOREIGN PATENT DOCUMENTS

| JP | 5-260554 | 10/1993 |
| JP | 2000-059459 | 2/2000 |
| JP | 2002-215483 | 8/2002 |

OTHER PUBLICATIONS

International Search Report issued Jan. 15, 2008 in the International (PCT) Application of which the present application is the U.S. National Stage.
English translation of Informal Comments filed in Response to Written Opinion of the International Searching Authority issued Jan. 15, 2008 in the international application of which the present application is the U.S. national phase.

(Continued)

*Primary Examiner*—Victor R Kostak
(74) *Attorney, Agent, or Firm*—Wenderoth, Lind & Ponack, L.L.P.

(57) ABSTRACT

A remote control system which controls plural devices connected to a bus, and which includes: a set top box (2) that is operated by a controller (4); and a DVD player (1) that transmits, to the plural devices connected to the bus, a first command indicating that the DVD player (1) is currently outputting video. Upon receiving the first command, the set top box (2) transmits, to the DVD player (1) via the bus, a second command corresponding to an operating signal transmitted from the controller, and the DVD player (1) receives the second signal and executes a process corresponding to the second command.

17 Claims, 27 Drawing Sheets

U.S. PATENT DOCUMENTS

| | | |
|---|---|---|
| 7,145,609 B2 * | 12/2006 | Kim .......................... 348/705 |
| 2002/0194596 A1 * | 12/2002 | Srivastava .................... 725/37 |
| 2003/0093804 A1 * | 5/2003 | Chang et al. .................. 725/95 |
| 2003/0134590 A1 | 7/2003 | Suda et al. |
| 2005/0123277 A1 * | 6/2005 | Ono et al. ..................... 386/94 |
| 2005/0132055 A1 * | 6/2005 | Neogi ........................ 709/227 |
| 2006/0084409 A1 * | 4/2006 | Ghadiali ..................... 455/352 |

OTHER PUBLICATIONS

High—Definition Multimedia Interface Specification Version 1.3a, Nov. 10, 2006, (see especially Chapter 13 "CEC 13 CEC Features Description", at pp. CEC 22-97).

* cited by examiner

FIG. 23

| Controller button name | Classification | CEC command |
|---|---|---|
| 1:Initial setting | Set top box-dedicated key | |
| 2:Television menu | Television-dedicated key | <Vendor Button>["MENU"] |
| 3:UP | Basic key | <User Control Pressed>["UP"] |
| 4:DOWN | Basic key | <User Control Pressed>["DOWN"] |
| 5:LEFT | Basic key | <User Control Pressed>["LEFT"] |
| 6:RIGHT | Basic key | <User Control Pressed>["RIGHT"] |
| 7:ENTER | Basic key | <User Control Pressed>["ENTER"] |
| 8:TV-program guide | Set top box-dedicated key | |
| 9:Power | Set top box-dedicated key | |

REMOTE CONTROL SYSTEM

TECHNICAL FIELD

The present invention relates to remote control systems, and particularly to a remote control system which allows plural devices to be controlled by one remote controller.

BACKGROUND ART

Conventionally, in an environment of viewing and listening to video and audio by connecting a television receiver (hereafter called "television") to a set top box, there are cases of viewing and listening to video and audio by further connecting a Digital Versatile Disc (DVD) player, and cases of listening to audio by further connecting an external AV amplifier and an external speaker, and outputting the audio from the speaker. In an Audio/Visual (AV) system such as this, in order to operate the respective devices, a user needs to switch among, and operate, remote controllers (hereafter called "controller") corresponding to each of the devices. Furthermore, between viewing and listening to video and audio outputted by the set top box and viewing and listening to video and audio outputted by the DVD player, the user needs to switch the input of the television. In addition, in order to use the respective functions included in the respective devices, such as operation of an electronic program guide, the user needs to perform troublesome operations such as switching among controllers corresponding to the devices.

As one method for solving this problem, a function called Consumer Electronics Control (CEC) has been defined in High-Definition Multimedia Interface (HDMI) (for example, see Non-Patent Reference 1). This is a function in which a television and various AV devices are connected by an HDMI cable, and transmit and receive CEC commands to each other via a CEC bus included in the HDMI cable. CEC defines a command which is transmitted with the destination of the command being specified, and a broadcast command for notifying a command to all CEC-compliant devices connected by HDMI, and communication is carried out using a combination of these commands. The CEC command, as shown in FIG. 1, includes the transmission destination device logical address, transmission destination device logical address, an operating code, and an operand.

Non-Patent Reference 1 defines One Touch Play, Routing Control, Device Menu Control, Remote Control Pass Through, and so on, as applications using a CEC command.

Hereinafter, device control in the conventional remote control system shall be described using FIG. 2.

As shown in FIG. 2, a remote control system includes a television 101, an AV amplifier 102, a DVD player 103, an external speaker 104, a set top box 105, and a controller 106.

The television 101 is a device for outputting video and audio outputted from a device connected via an HDMI cable.

The AV amplifier 102, to which HDMI input terminal the DVD player 103 is connected, receives video and audio from the DVD player 103 via the HDMI input terminal, and outputs the video outputted from the DVD player 103 to the television 101 connected to an HDMI output terminal, while outputting audio from the external speaker 104. Furthermore, the AV amplifier 102 can switch between the input from another device not shown in the diagram and the input from the DVD player 103, and output video to the television 101.

The DVD player 103 is a device which decodes video content recorded on a DVD, and outputs video and audio via the HDMI cable.

The set top box 105 is a device which outputs video and audio of a cable television broadcast, via the HDMI cable.

In the above-described configuration, when the DVD player 103 starts playback, for example, the DVD player 103 transmits a <Text View On> command or an <Image View On> command to the television 101, and transmits an <Active Source> command indicating the start of video output. The television 101 and the AV amplifier 102 which receive the respective commands, each perform input switching automatically so that the video of the DVD player 103 is outputted based on the parameters of the commands. Furthermore, when the television 101 is OFF, the television automatically turns ON.

Furthermore, when the user operates the DVD player 103 by operating the controller 106 of the television 101, the signal transmitted from the controller 106 is received by the television 101, and the television 101 transmits a command corresponding to the signal of the controller, to the DVD player 103. Upon receiving the command, the DVD player 103 performs the corresponding operation thereby enabling the user to operate the DVD player 103 using the controller of the television 101.

Furthermore, another example of device control in the conventional remote control system shall be described using FIG. 3.

As shown in FIG. 3, a remote control system includes a television 301, a DVD player 302, a DVD recorder 303, a set top box 304, and a controller 305.

The television 301 is a device for outputting video and audio outputted from a device connected via an HDMI cable.

The DVD player 302 is a device which decodes video content recorded on a DVD, and outputs video and audio via the HDMI cable.

The DVD recorder 303, like the DVD player 302, is a device which decodes video content recorded on a DVD, and outputs video and audio via the HDMI cable. Furthermore, the DVD recorder 303 has a function for receiving and encoding video and audio, and recording the encoded video and audio on a recording DVD.

The set top box 304 is a device which outputs video and audio of a cable television broadcast, via the HDMI cable.

Devices connected through the HDMI cable obtain a physical address by Display Data Channel (DDC) communication defined in the HDMI Standard. Here, DDC communication is a function for inquiries: from a device (called a source device) connected by the HDMI cable, which transmits video and audio; to a device (called a sink device) which receives video and audio; regarding the device-type information of the sink device, the reproducible video and audio format, the physical address assigned to the source device, and so on. The logical address is an address given according to terminals connected by the HDMI cable, and is, for example, 1.0.0.0 when connected to a first terminal of the television, and 2.0.0.0 when connected to the second terminal.

In the configuration indicated in FIG. 3, when the DVD player 302 starts playback, for example, the DVD player 302 transmits an <Active Source> command, which is a broadcast command indicating the start of video and audio output, with the physical address of the transmission source device as a parameter. Upon receiving the command, the television 301 automatically performs input switching, based on the parameter of the <Active Source> command, so that the video of the DVD player 302 is outputted. Furthermore, when the television 301 is OFF, the television automatically turns ON.

Furthermore, when the user operates the DVD player 302 by operating the controller 305 of the set top box 304, the signal transmitted from the controller 305 is received by the set top box 304. The set top box 304 transfers a CEC command corresponding to the signal received from the controller 305, to the DVD player 302. The DVD player 302 receiving the command performs an operation corresponding to the command. With this, the user is able to operate the DVD player 302 by operating the controller 305 of the set top box 304.

Furthermore, according to Patent Reference 1, in an AV system including an AV bus for transmitting data signals such as a command, a video signal, and an audio signal, between a television and respective devices in the AV system, the respective devices are controlled by operating the television.

Hereinafter, the device control in Patent Reference 1 shall be described using FIG. 4.

Respective devices in an AV system are connected by an AV bus, and a signal passing through the bus has the form of a packet. Furthermore, each packet includes a transmission source address indicating the device that transmitted the data, and a destination address indicating the destination of the data.

A television 311 receives a command transmitted from a controller 315, and transmits a command to the AV bus according to the details of the received command.

When receiving the command from the AV bus, each of a DVD player 312, a DVD recorder 313, and a set top box 314 analyzes and executes the command when the destination address of the command is addressed to it. Furthermore, when the command is not addressed to it, the command is disregarded without being analyzed.

Hereinafter, the operation in the case where the DVD player 312 plays back video recorded on a DVD, and displays the video on the television 311, in the AV system in Patent Reference 1 shall be described.

First, when the user presses a power ON button of the controller 315, a signal indicating power ON is transmitted. Upon receiving the signal, the television 311 performs the checking of the connection state of devices connected to the AV bus, the detection of malfunctions, and so on.

Next, when the user presses a menu button of the controller 315, the television 311 displays a first control window on a screen. Icons indicating AV devices such as the DVD player, and a cursor are displayed on the first control window. The user can move the cursor by pressing UP, DOWN, LEFT, and RIGHT buttons on the controller 315, and activate, in the television 311, a program corresponding to the icon indicated by the cursor, by pressing an ENTER button.

Next, when the user points the cursor to the icon indicating the DVD player and presses the ENTER button, the television 311 displays a second control window. Icons for setting the operating mode of the DVD player, such as playback and stop, and a cursor are displayed on the second control window. By performing the same operation as in the case of the first control window, the user can activate a program corresponding to the icon indicated by the cursor. In the case of performing playback using the DVD player 312, the user points the cursor to the icon indicating playback and presses the ENTER button. Then, the television 311 generates a command for setting the DVD player 312 to the playback mode, adds a destination address indicating the DVD player 312, and transmits the command to the AV bus.

The DVD player 312 checks the destination address of the command transmitted by the AV bus and, when the destination address indicates the DVD player 312, analyzes the details of the command and executes the command. In the case where the received command is a command for setting the playback mode, the DVD player 312 starts playback of the DVD.

Non-Patent Reference 1: High-Definition Multimedia Interface Specification Version 1.3a Patent Reference 1: Japanese Unexamined Patent Application Publication No. 5-260554

DISCLOSURE OF INVENTION

Problems that Invention is to Solve

However, in the case where the user is viewing a cable television broadcast received by the set top box, there are instances where there is a difference in channel-receiving capability between the television and set top box. As such, the user is required to constantly use the controller of the set top box to operate the television, the DVD player, and the DVD recorder.

According to Non-Patent Reference 1, when the user operates the DVD player by operating the controller of the set top box, the signal transmitted from the controller is received by the set top box. Furthermore, the set top box transmits, to the DVD player, a CEC command corresponding to the signal received from the controller. In addition, the DVD player 302 receiving the CEC command performs the operation corresponding to the received CEC command. With this series of operations, the user is able to operate the DVD player using the controller of the set top box.

However, the television can display a menu generated by a microcomputer built-into the television, by superimposition onto the video outputted by the DVD player. As such, there are cases where both the television and the DVD player have a function for displaying a menu and allowing the operation of various functions through the user's operation of a cursor displayed on the menu. In such a configuration, for example, there is a possibility that the UP, DOWN, LEFT, RIGHT buttons, and the like, used in moving the cursor of the menu are used for the television and the DVD player alike. Therefore, in the case where the user operates the television and the DVD player by using the controller, the set top box must select to which device the command should be transmitted, and it becomes difficult to transmit a command so as to control the DVD player.

For example, although the <Active Source> command is broadcast when the DVD player plays back a DVD, in the case where the user watches the video of the DVD player, and operates the functions of the television by a menu of the television, such as picture quality adjustment of the television, the menu of the television is displayed by being superimposed on the video of the DVD player. However, the set top box cannot recognize which device between the television and the DVD player is displaying the menu on the screen. As such, with respect to the signal received from the controller, the set top box is unable to determine the device to which the command should be transmitted. Furthermore, HDMI defines a broadcast command for sending a command to all devices, including a television and a DVD player, connected to a CEC bus. However, when the broadcast command is transmitted, a device that is not intended by a user, such as a DVD recorder that is not displaying video on the television, performs. As such, the set top box cannot perform broadcast command-based command transfer. Therefore, in the conventional remote control system, the user cannot operate various AV devices including a television as well as a DVD player and a DVD recorder, by using one controller.

Thus, the present invention is conceived in order to solve the aforementioned problem and has as an object to provide a remote control system, a remote control method, and a command transfer method that allows a television and various AV devices to be controlled via a set top box, using a controller of the set top box.

Means to Solve the Problems

In order to achieve the aforementioned object, the remote control system according to an aspect of the present invention is a remote control system for controlling plural devices connected to a bus, the remote control system includes: a first video output apparatus operated by a remote controller; and a second video output apparatus which transmits a first command to the devices connected to the bus, the first command indicating that the second video output apparatus is currently outputting video, wherein the first video output apparatus transmits a second command to the second video output apparatus, via the bus, in the case of receiving the first command, the second command corresponding to an operating signal transmitted from the remote controller, and the second video output apparatus receives the second command and executes a process corresponding to the second command.

For example, assuming that the first video output apparatus is a set top box, the second video output apparatus is an AV device such as a DVD player, and the like, and the bus is a CEC bus, it is possible to operate the AV device from a remote controller of the set top box.

It is preferable that the remote control system further includes a video display apparatus connected to the bus, wherein the first video output apparatus transmits a predetermined third command to the video display apparatus connected to the bus, whether or not the first command is received, and the video display apparatus receives the third command and executes a process corresponding to the third command.

For example, assuming that the video display apparatus is a television receiver, and the third command is a command for displaying a menu, it is possible to cause the television receiver to display the menu, from the remote controller of the set top box.

The remote control system according to another aspect of the present invention is a remote control system including a first video output apparatus having a remote controller, a video display apparatus, and at least one second video output apparatus that are connected to a bus, and which receives a command issued from the remote controller and transfers the received command, via the bus, to at least one of the video display apparatus and the at least one second video apparatus, wherein the first video output apparatus includes: a recognition unit which recognizes that the at least one second video output apparatus is in an operational state, based on a state-recognition command received from the at least one second video output apparatus, via the bus, the state-recognition command indicating that the at least one second video output apparatus is in an operational state, a classification unit which classifies the command issued from the remote controller; and a transfer unit which: in the case where the classification unit classifies the command as a dedicated command for the video display apparatus, transfers the dedicated command to the video display apparatus; and in the case where the classification unit classifies the command as a common command which can be run commonly among plural devices connected to the bus, transfers, via the bus, to the video display apparatus and the at least one second video output apparatus that is in the operational state, a command in which the common command is attached with a code indicating the video display apparatus as a transmission destination, and a command in which the common command is attached with a code indicating the at least one second video output apparatus that is in the operational state as the transmission destination.

For example, assuming that the bus is a CEC bus, the first video output apparatus is a set top box for cable television broadcasts, the video display apparatus is a television, and the second video output apparatus is an AV device such as a DVD player, and the like, it is possible to operate the AV device and the television from a remote controller of the set top box. Furthermore, even when plural devices are connected to the bus, a command only affects the AV device that is currently being viewed and the television, and does not affect AV devices that are not being viewed.

Note that the present invention can be implemented, not only as such a remote control system, but also as a remote control method and command transfer method which include, as steps, the characteristic units included in such a remote control system, and as a program which causes a computer to execute such steps. Moreover, it should be obvious that such a program can be distributed via a recording medium such as a CD-ROM and so on, or a transmission medium such as the Internet, and so on.

Effects of the Invention

With the present invention, it is possible to provide a remote control system in which, even when video outputted by an AV device other than a set top box is currently being viewed through a television, it is possible to operate the television and the AV device using a controller of the set top box.

BRIEF DESCRIPTION OF DRAWINGS

FIG. 23 is a flowchart showing an example of a table indicating the correspondence relationship of a signal received by the set top box, the processing method for the signal, and a CEC command, in the third embodiment of the present invention.

Figure 1:
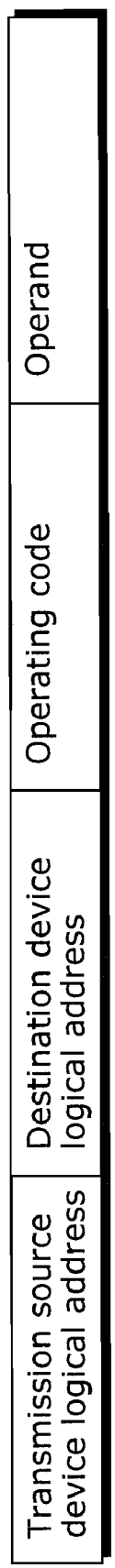
FIG. 1 is a diagram showing the structure of a CEC command.
Figure 2:
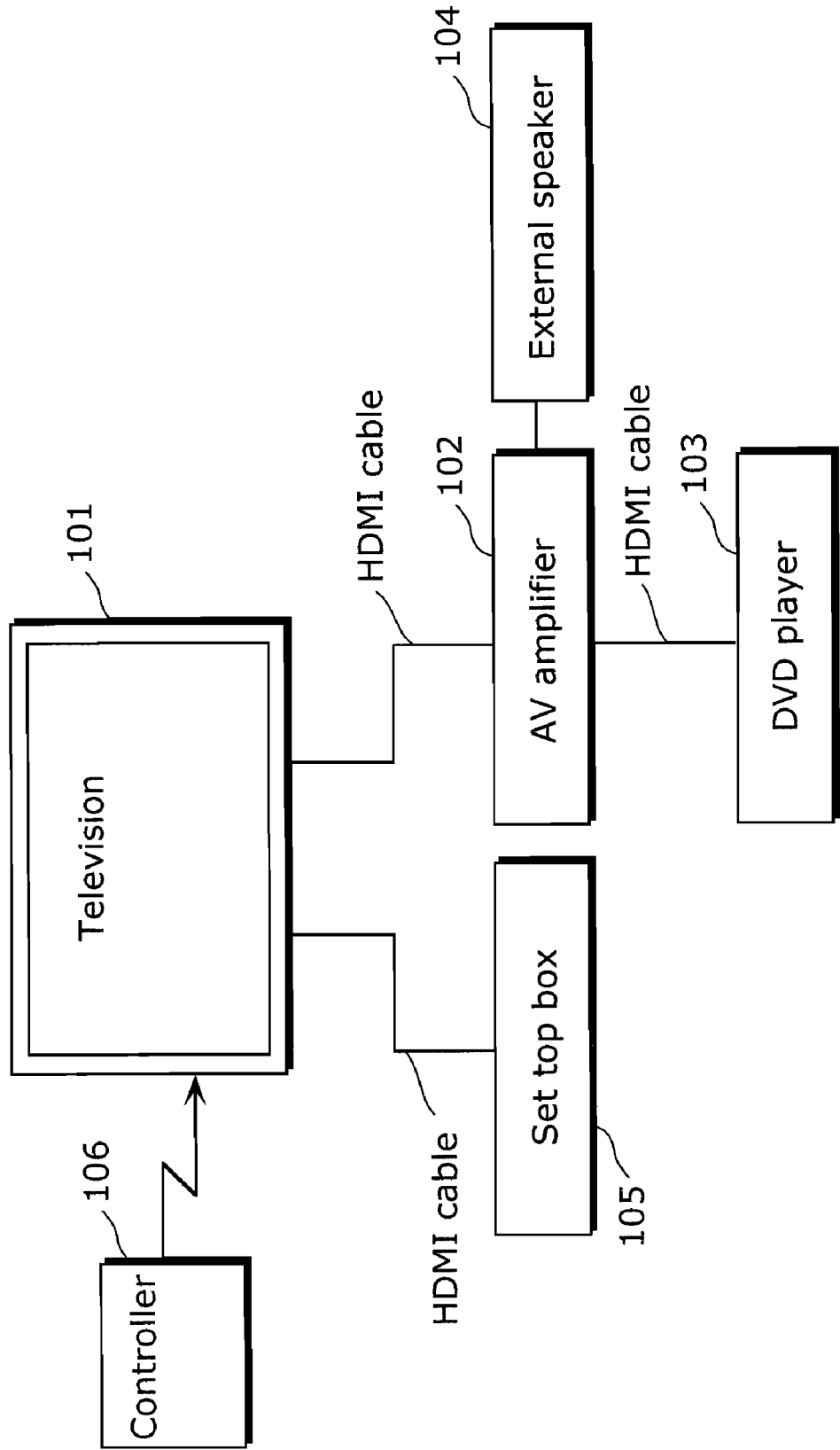
FIG. 2 is a diagram showing the outline configuration of a conventional AV device remote control system.
Figure 3:
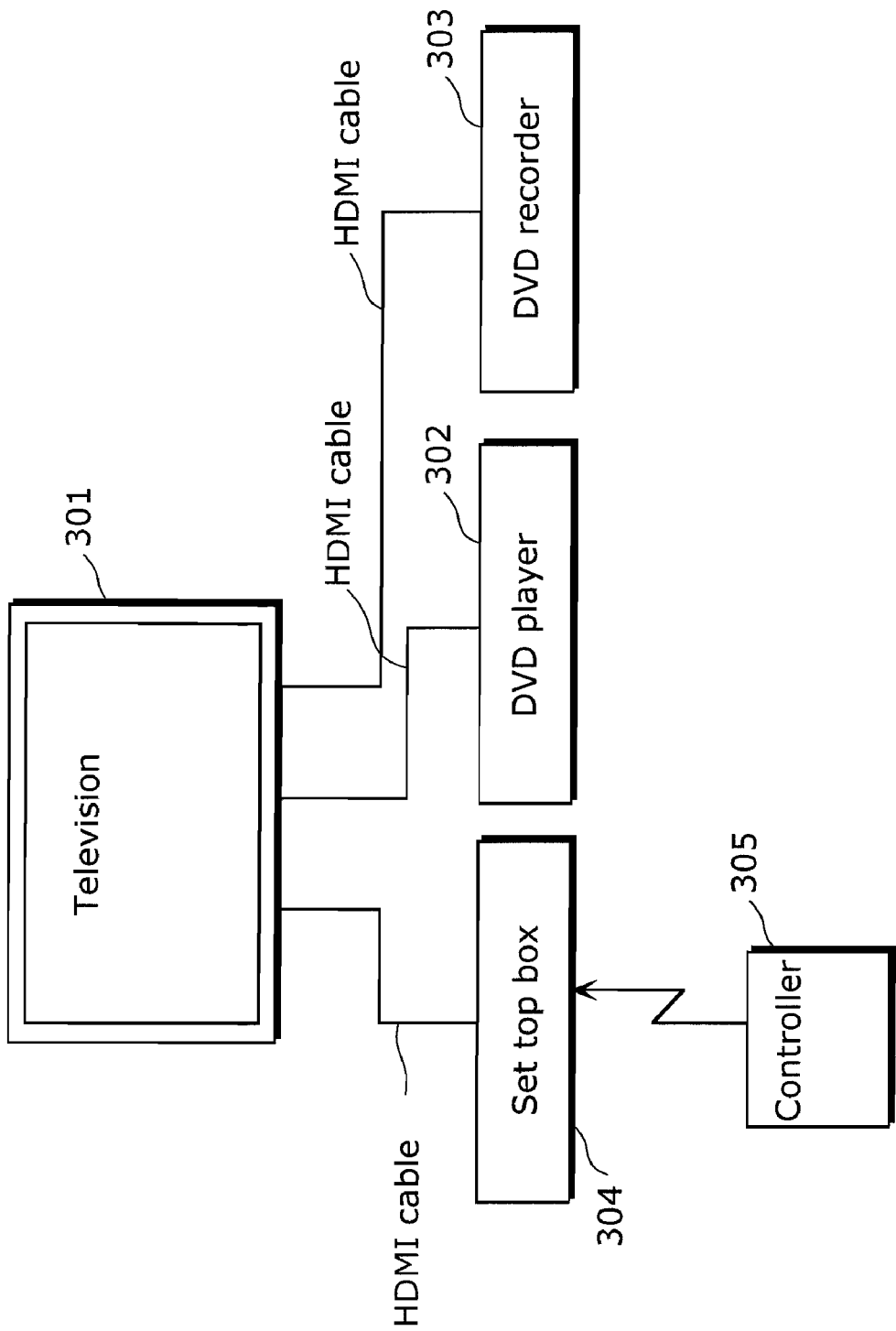
FIG. 3 is a diagram showing the outline configuration of the conventional AV device remote control system in Non-Patent Reference 1.
Figure 4:
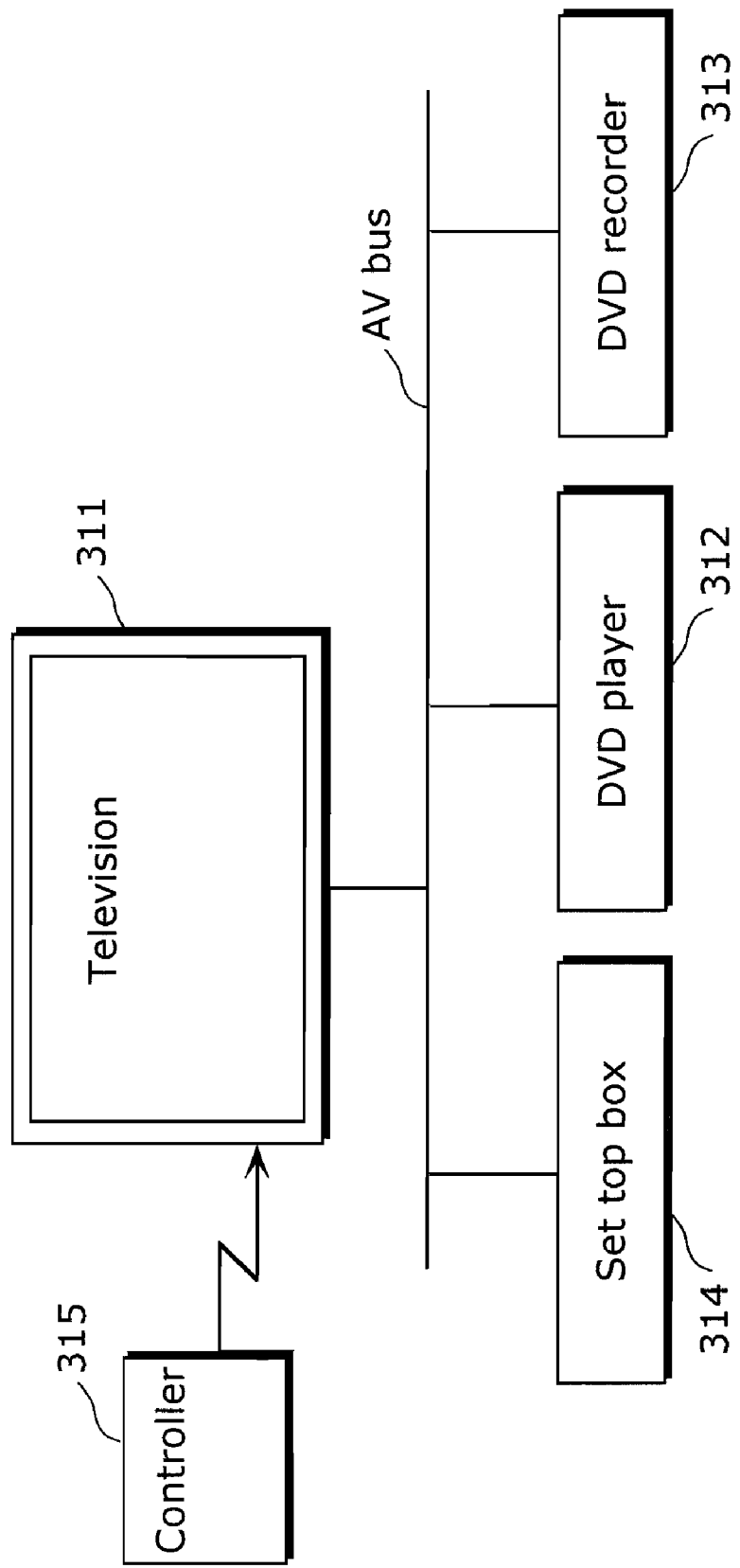
FIG. 4 is a diagram showing the outline configuration of the conventional AV device remote control system in Patent Reference 1.

NUMERICAL REFERENCES 1, 103, 302, 312 DVD player
2, 105, 304, 314 Set top box
3, 101, 203, 301, 311 Television
4, 106, 305, 315 Controller
5 Display
6, 18 Tuner
7, 13, 17, 25, 37 Memory
8, 12, 16, 24, 36 Microcomputer
9 Decoder
10, 11, 34, 212 HDMI input unit
14, 19, 26, 32 HDMI output unit
15 Controller reception unit
20 Controller transmission unit
21 Input unit
30, 102 AV amplifier
35 Amplifier
31, 104 External speaker
33 Selector
41 Menu
42 Cursor
205, 303, 313 DVD Recorder

BEST MODE FOR CARRYING OUT THE INVENTION

Hereinafter, embodiments of the present invention shall be described with reference to the drawings.

FIRST EMBODIMENT

<Configuration>

Figure 5:
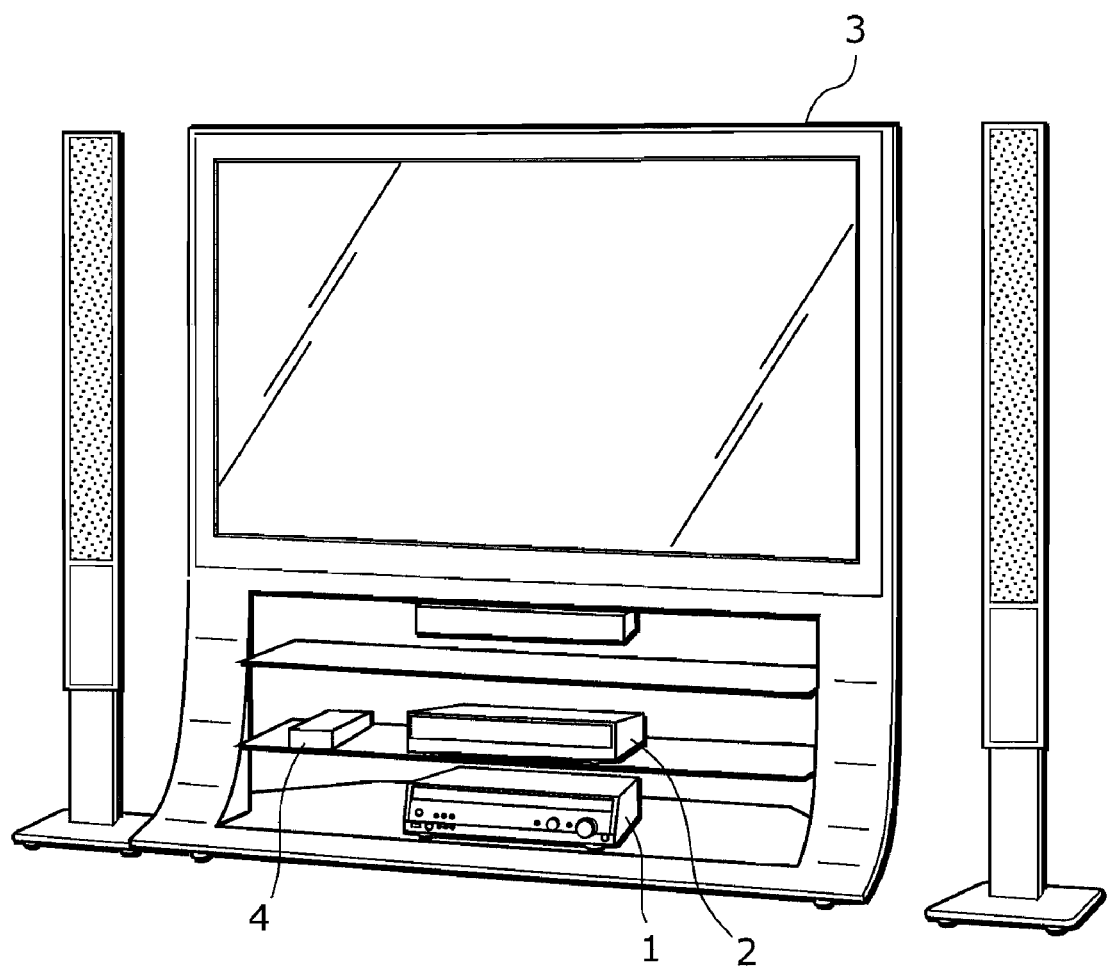
FIG. 5 is an external view of a remote control system in a first embodiment of the present invention.
Figure 6:
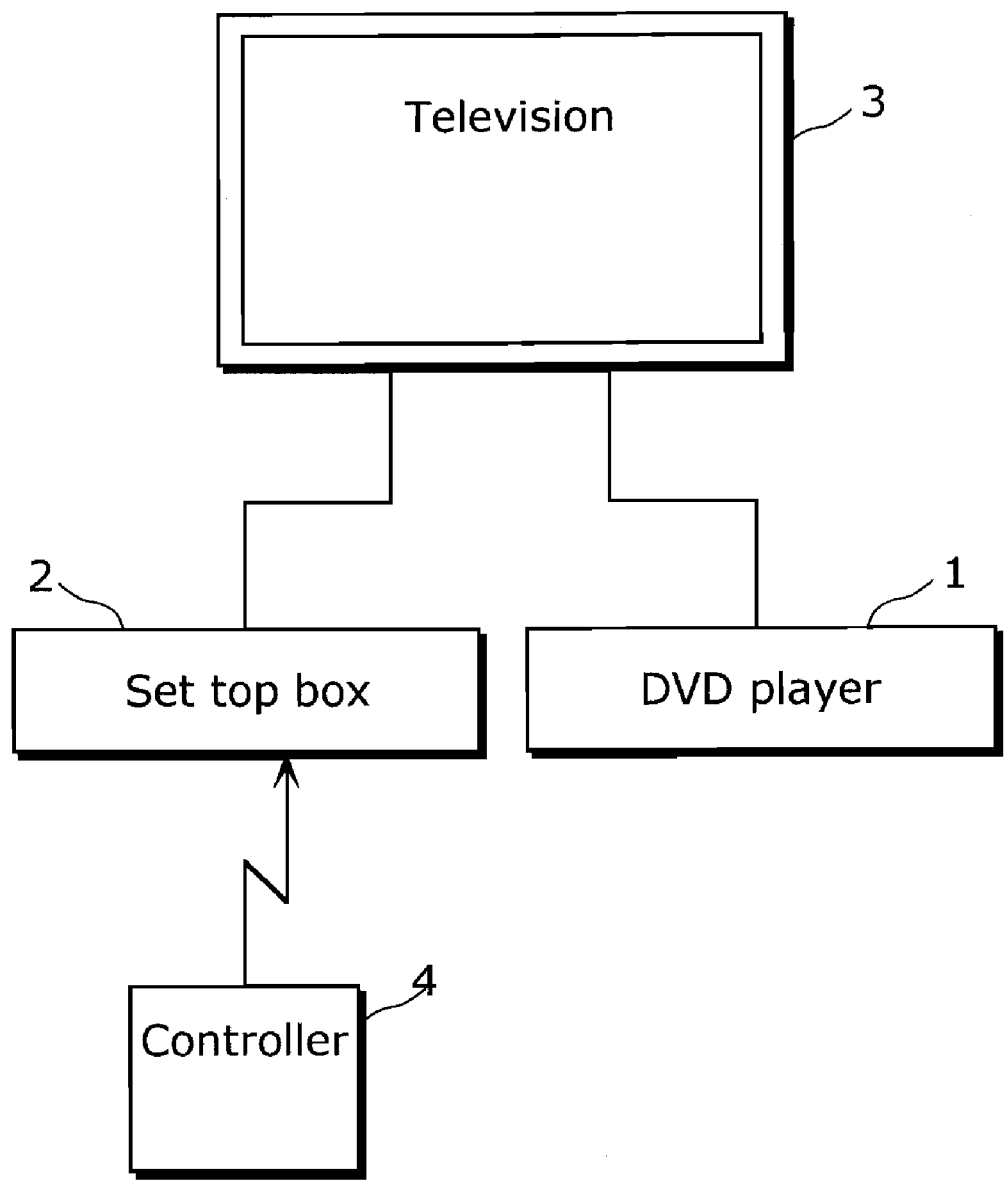
FIG. 6 is a diagram showing the outline configuration of the remote control system in the first embodiment of the present invention.
Figure 7:
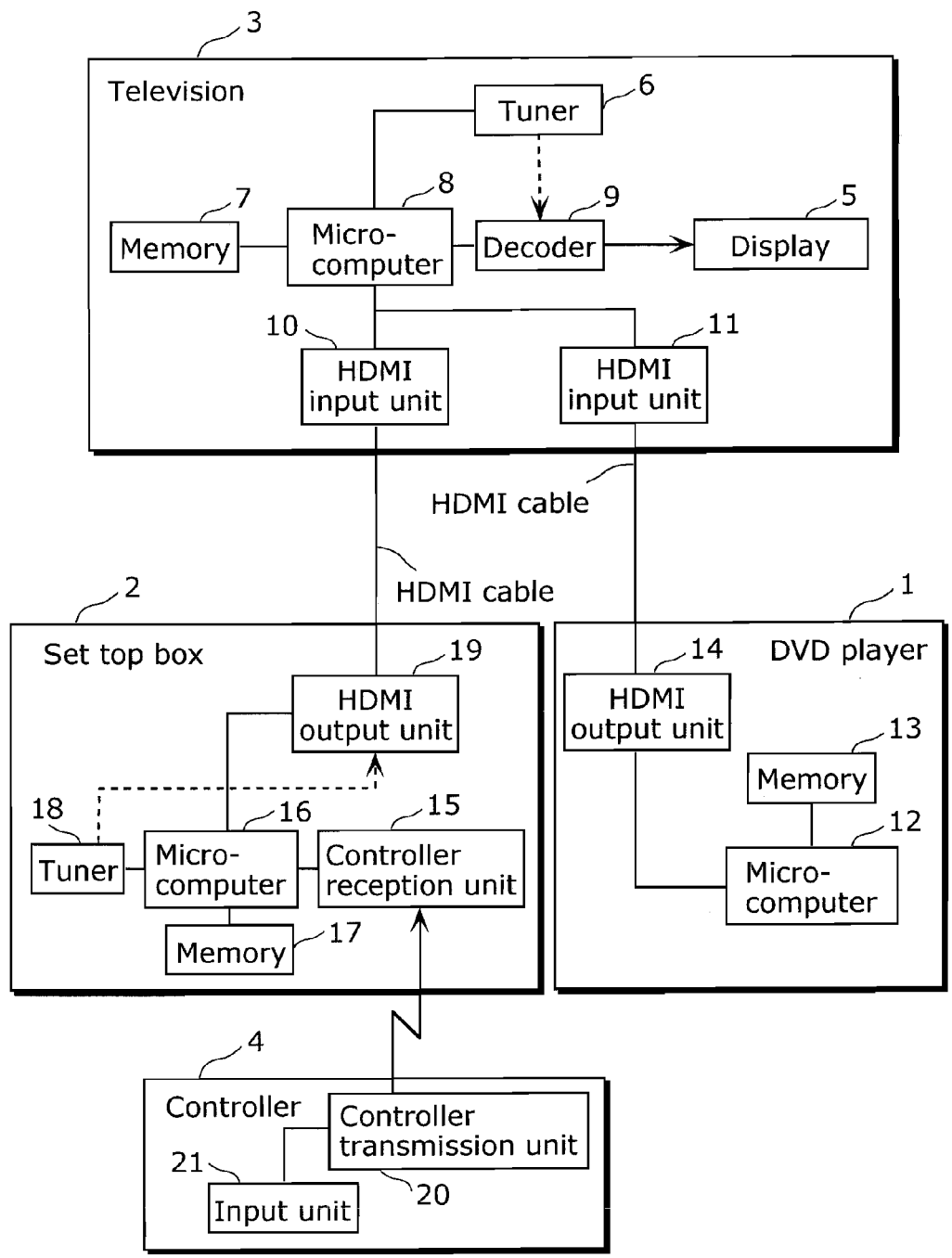
FIG. 7 is a function block diagram of the remote control system in the first embodiment of the present invention.

FIG. 5 is an external view of a remote control system in a first embodiment. Furthermore, FIG. 6 is a diagram showing the outline configuration of the remote control system in the first embodiment. Furthermore, FIG. 7 is a function block diagram of the remote control system in the first embodiment. Note that a set top box 2 in the first embodiment is an example of the first video output apparatus, a DVD player 1 is an example of the second video output apparatus, a television 3 is an example of the video display apparatus.

As shown in FIG. 5 and FIG. 6, the remote control system includes the DVD player 1, the set top box 2, the television 3, and a controller 4.

The DVD player 1 is a device which plays video content recorded on a DVD by decoding it, and outputting video and audio via the HDMI cable.

The set top box 2 is a device which outputs video and audio of a cable television broadcast, via the HDMI cable.

The television 3 is a device for outputting video and audio outputted from a device connected via the HDMI cable.

The controller 4 is a device which transmits signals mainly to the set top box 2.

The television 3 and the set top box 2 are connected by the HDMI cable, and the video and audio decoded by the set top box 2 are transmitted to the television 3 through the HDMI cable.

Furthermore, the television 3 and the DVD player 1 are also connected by the HDMI cable, and the video and audio played back by the DVD player 1 are also transmitted to the television 3 in the same manner as with the set top box 2.

Furthermore, the television 3, the set top box 2, and the DVD player 1 can transmit and receive CEC commands to and from each other via a CEC bus of the HDMI cable. The line of the CEC bus is included inside the tube of the HDMI cable together with the line for transmitting video and audio, and connection of the CEC bus is also carried out through the connection between devices using the HDMI cable.

As shown in FIG. 7, the television 3 is an example of the video display apparatus, and includes a display 5, a tuner 6, a memory 7, a microcomputer 8, a decoder 9, an HDMI input unit 10, and an HDMI input unit 11.

The display 5 displays video, menus, and so on, obtained from the decoder 9.

The microcomputer 8 interprets a CEC command and a command according to the operation of a controller of the television 3, and performs various processes. Furthermore, the microcomputer 8 also controls the decoder 9 and the tuner 6 as necessary.

The tuner 6 receives a television broadcast wave received through an antenna not shown in the diagram and, for example, when the broadcast received is a digital broadcast, sends the data thereof to the decoder 9.

The decoder 9 decodes video and audio from the broadcast wave obtained by the tuner 6, converts the result into an appropriate signal for displaying on the display 5, and sends the signal to the display 5. Furthermore, the decoder 9 also converts video obtained from the HDMI input unit 10, the HDMI input unit 11, and other external video inputs not shown in the diagram, into an appropriate signal for displaying on the display 5, and sends the signal to the display 5.

The HDMI input unit 10 and the HDMI input unit 11 are connected to an HDMI output unit 19 of the set top box 2 and an HDMI output unit 14 of the DVD player 1, respectively, and receive an HDMI signal. Furthermore, together with the reception of HDMI signals, the HDMI input unit 10 and the HDMI input unit 11 perform the transmission and reception of CEC commands.

A CEC unit of the HDMI input unit 10 and a CEC unit of the HDMI input unit 11 are bus-connected, and are respectively connected to the HDMI input unit 10 and the HDMI input unit 11 with respect to the set top box 2 and the DVD player 1. As such, mutual transmission and reception of CEC commands between the set top box 2 and the DVD player 1 is possible. Note that aside from the set top box 2 and the DVD player 1 in the present embodiment, electrical devices such as a DVD recorder or a video tape recorder can also be connected to the HDMI input unit 10 and the HDMI input unit 11.

The DVD player 1 includes a microcomputer 12, a memory 13, and the HDMI output unit 14; reads a signal recorded on a DVD, using a DVD reading device not shown in the diagram; decodes video, still images, and audio; and outputs video and audio, as HDMI signals, through the HDMI output unit 14.

The microcomputer 12, while using the memory 13: controls the DVD reading device not shown in the diagram; processes inputs from an input unit not shown in the diagram, included in the DVD player 1; and controls the HDMI output unit 14. Furthermore, the microcomputer 12 also instructs the decoding upon receiving a CEC command received by the HDMI output unit 14, and the outputting of a CEC command to the HDMI output unit 14.

The HDMI output unit 14 outputs video and audio decoded by the DVD reading device, as HDMI signals, to the HDMI input unit 11. Furthermore, together with the transmission of HDMI signals, the HDMI output unit 14 also performs communication of CEC commands.

The set top box 2 includes a controller reception unit 15, a microcomputer 16, a memory 17, a tuner 18, and the HDMI output unit 19.

The microcomputer 16, while using the memory 17: controls the tuner 18; processes inputs from another input unit not shown in the diagram, included in the set top box 2; and controls the HDMI output unit 19. Furthermore, the microcomputer 16 also instructs, when the HDMI output unit 19 receives a CEC command, the decoding of the CEC command, and the outputting of a CEC command to the HDMI output unit 19. Furthermore, upon receiving a CEC command (called "<Active Source>") indicating the current outputting of video, the microcomputer 16 stores, in the memory 17, information identifying the transmission source device of the command.

The HDMI output unit 19 outputs video and audio decoded by the DVD reading device, as HDMI signals, to the HDMI input unit 10. Furthermore, together with the transmission of HDMI signals, the HDMI output unit 19 also performs communication of CEC commands.

The tuner 18 receives and decodes a cable television broadcast signal, and transmits video and audio to the HDMI output unit 19.

The controller reception unit 15 receives a signal transmitted from the controller 4 through a wireless communication means such infrared rays and radio waves, and sends a result of the decoding of such signal to the microcomputer 16.

The controller 4 includes a controller transmission unit 20 and an input unit 21.

The input unit 21 is configured of any or a combination of, for example, a push button, a toggle switch, an arrow key, a joystick, and so on.

The controller transmission unit 20 transmits a signal corresponding to the input obtained through the input unit 21, to the controller reception unit 15, using a wireless communication means such as infrared rays or radio waves.

<Operation>

The operation of the remote control system when a user performs an operation using a controller, in an embodiment of the present invention, shall be described using FIG. 8 to FIG. 17.

(Operation when Operating the Set Top Box)

Figure 8:
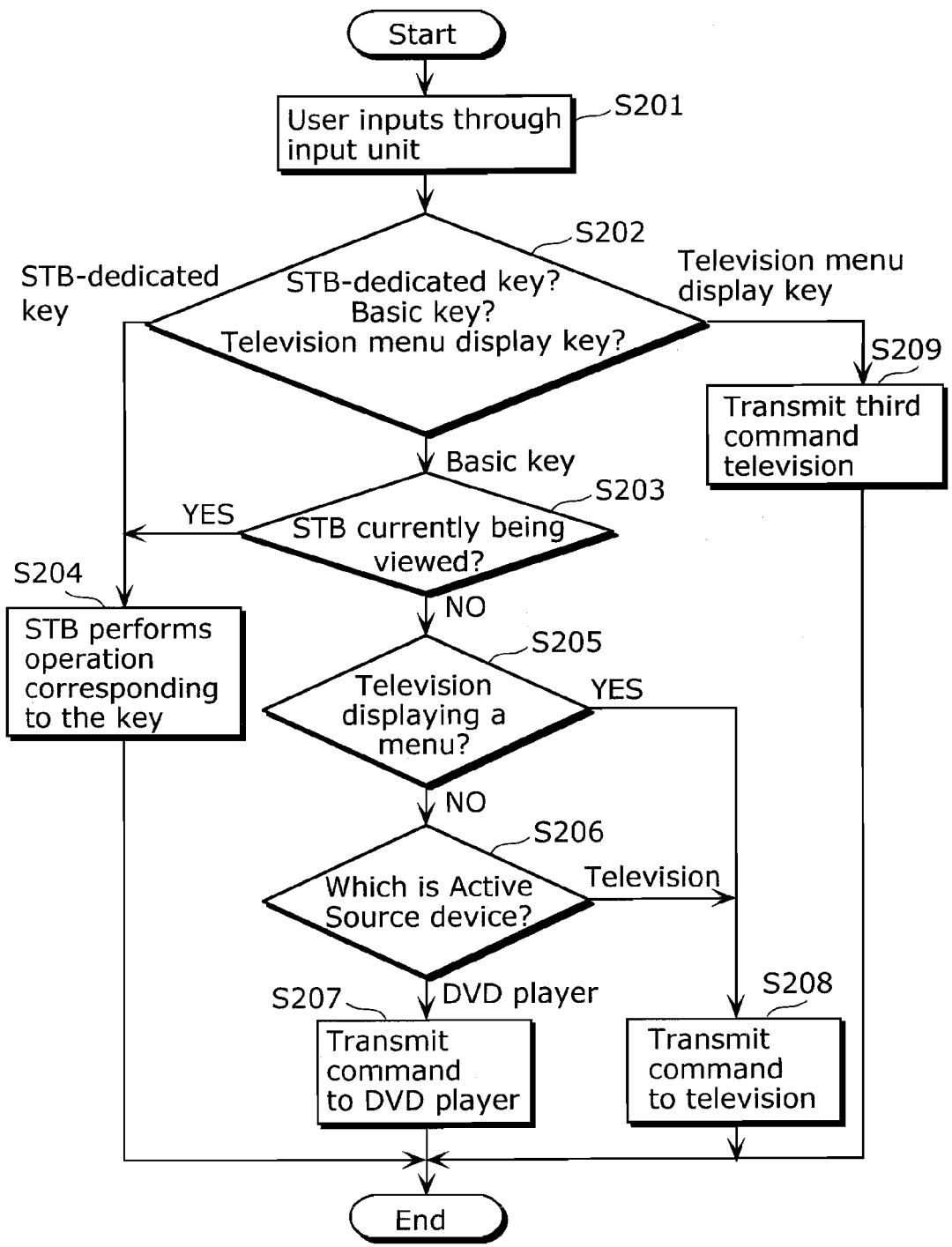
FIG. 8 is a flowchart showing the operation of a set top box in the first embodiment and second embodiment of the present invention.

The flow of operation when the user operates the set top box 2 using the controller 4 shall be described using FIG. 8.

First, when the user presses any of buttons which are the input unit 21 of the controller 4, the signal corresponding to the button is transmitted by the controller transmission unit 20, received by the controller reception unit 15, and notified to the microcomputer 16 (step S201).

The microcomputer 16 judges whether or not the signal received in step S201 is a signal of a key (hereafter called a "basic key") that is common to other devices, such as "UP", "DOWN", "LEFT", "RIGHT", and "ENTER" (step S202).

In the case where it is judged that the signal received in step S201 is not a signal of a basic key and is a signal of a dedicated key for operating the set top box 2 (STB-dedicated key in step S202), the set top box 2 performs a process corresponding to the signal of such key (step S204).

In the case where it is judged that the signal received in step S201 is a signal of a basic key (basic key in step S202), the microcomputer 16 refers to the memory 17 and checks for the last device that transmitted an <Active Source> command (step S203). When the last device that transmitted the <Active Source> command is the set top box 2 (YES in step S203), the user is currently viewing the cable television broadcast received by the set top box 2, and thus the operation corresponding to the signal transmitted in step S201 is executed on the set top box 2 (step S204). With this, the user is able to use the functions included in the set top box 2 by using the controller 4. Furthermore, it is also possible for the microcomputer 16 to generate a Graphical User Interface (GUI), and for the user to operate a GUI menu included in the set top box 2 by operating the controller 4.

(Operation when Operating the DVD Player)

Hereinafter, the flow of operations of the set top box 2, the television 3, and the DVD player 1 when the user operates the DVD player 1 by using the controller 4 shall be described.

Figure 9:
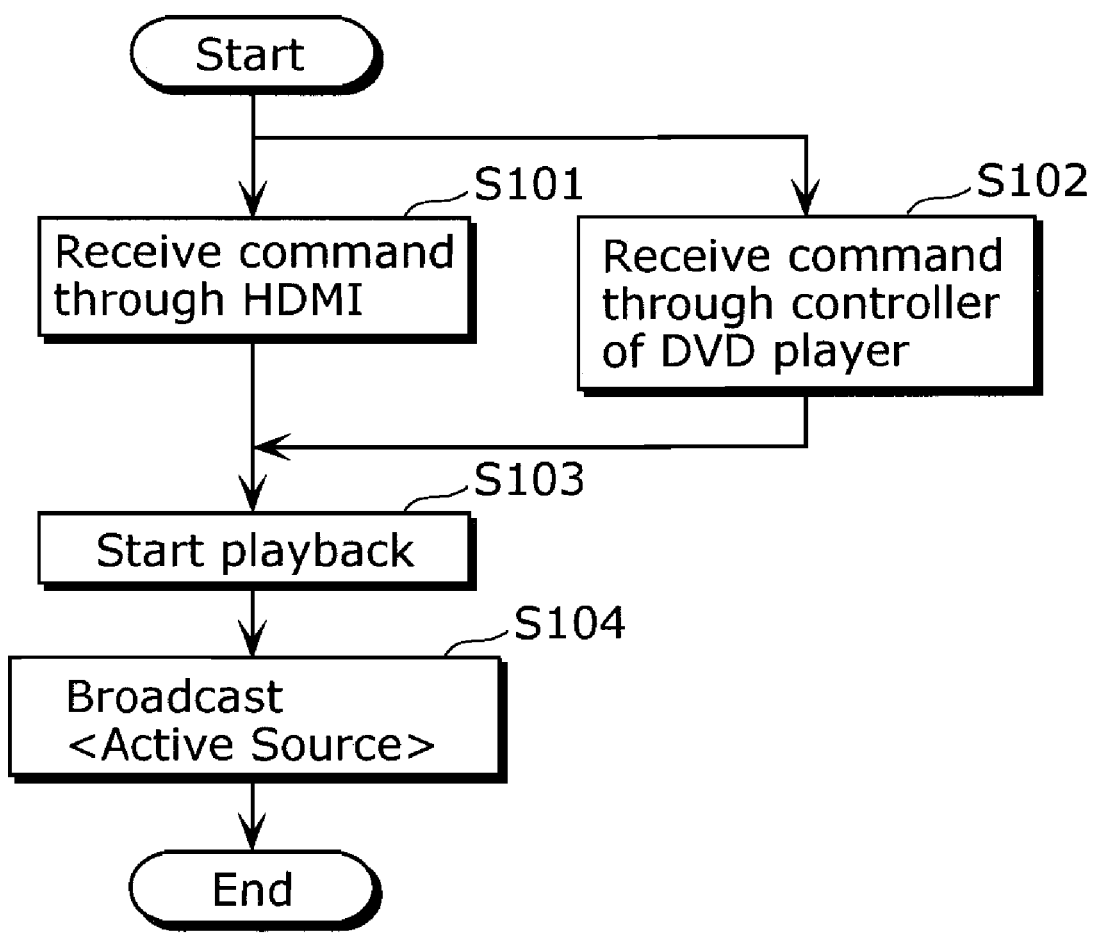
FIG. 9 is a flowchart showing the operation of a DVD player in the first embodiment and the second embodiment of the present invention.

FIG. 9 is a flowchart showing the operation of the DVD player.

First, through the user's operation of the controller 4 and the GUI menu of the set top box 2, the microcomputer 16 of the set top box 2 executes a program which activates the DVD player 1 and causes the start of playback. With the execution of the program, the microcomputer 16 of the set top box 2 transmits plural CEC commands for activating the DVD player 1 and starting playback. Upon receiving the commands (step S101), the DVD player 1 starts the playback of a DVD (step S103). Furthermore, when the start of DVD playback is instructed through an input unit of the DVD player 1, which is not shown in the diagram (step S102), the DVD player starts the playback (step S103).

Figure 10:
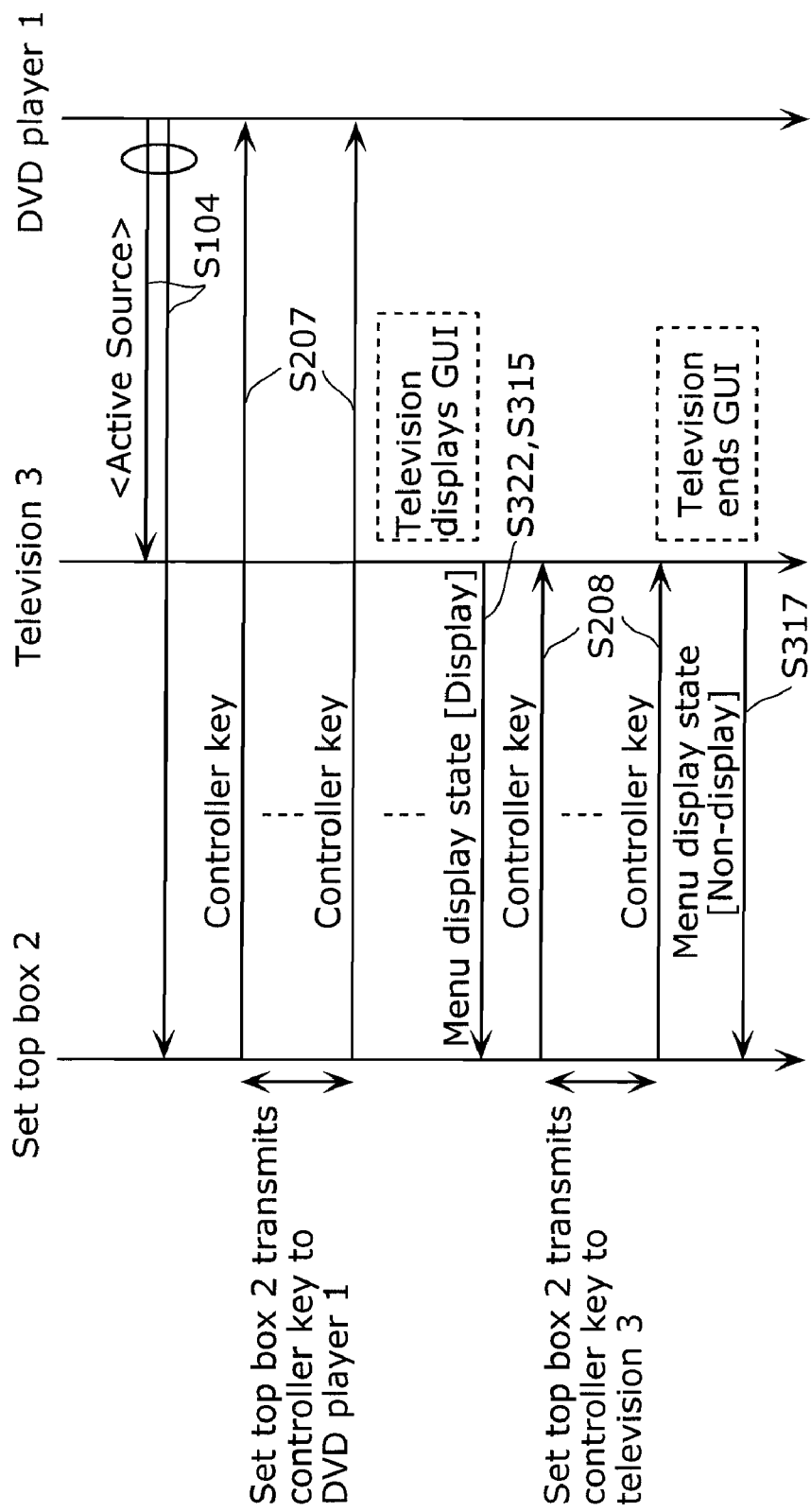
FIG. 10 is a diagram showing the operation of the remote control system in the first embodiment of the present invention.

When starting the playback, the DVD player 1 broadcasts <Active Source> as a first command (step S104, FIG. 10).

Figure 11:
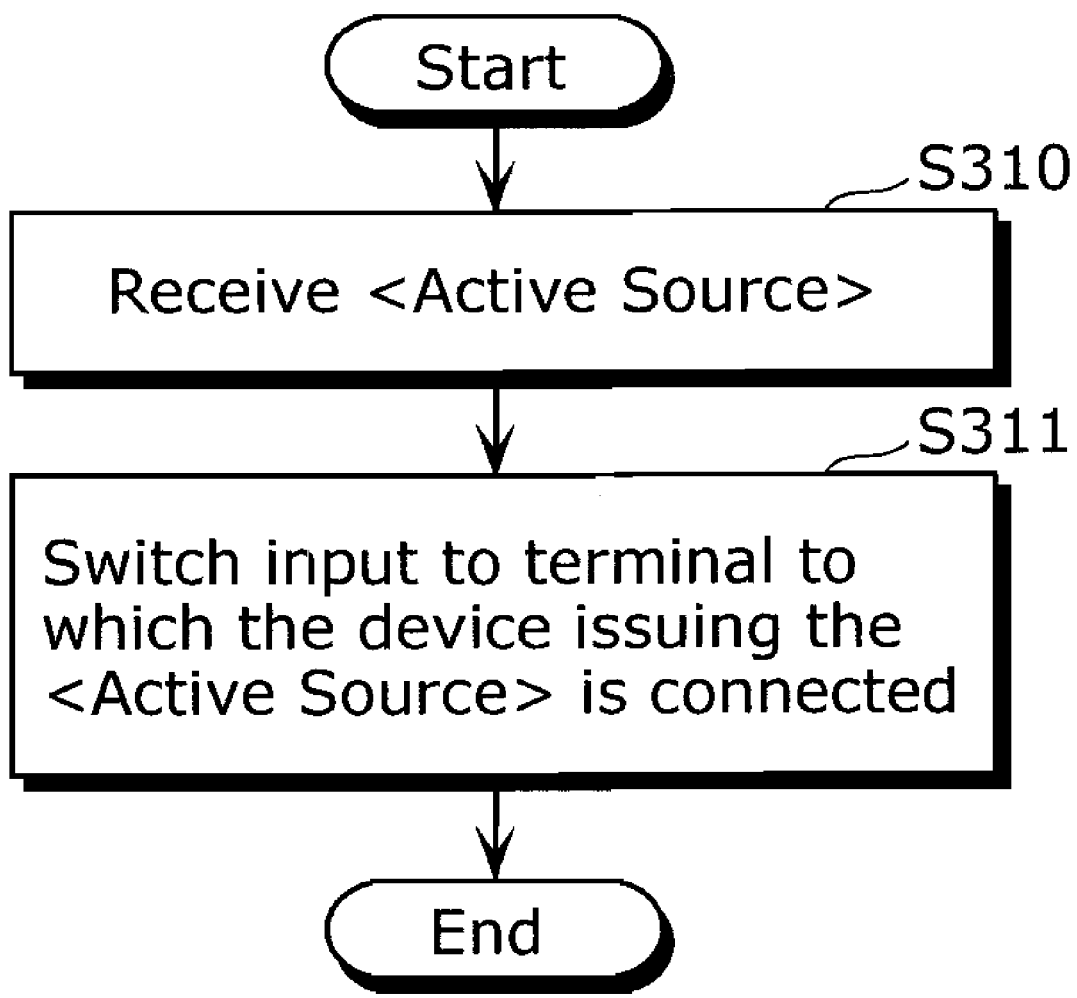
FIG. 11 is a flowchart showing the operation of a television in the first embodiment and the second embodiment of the present invention.

FIG. 11 is a flowchart showing the operation of the television.

The television 3 receives the <Active Source> command (step S310), and switches the input to the terminal to which the DVD player 1 is connected. With this, the video outputted from the DVD player 1 is displayed on the television 3.

Figure 12:
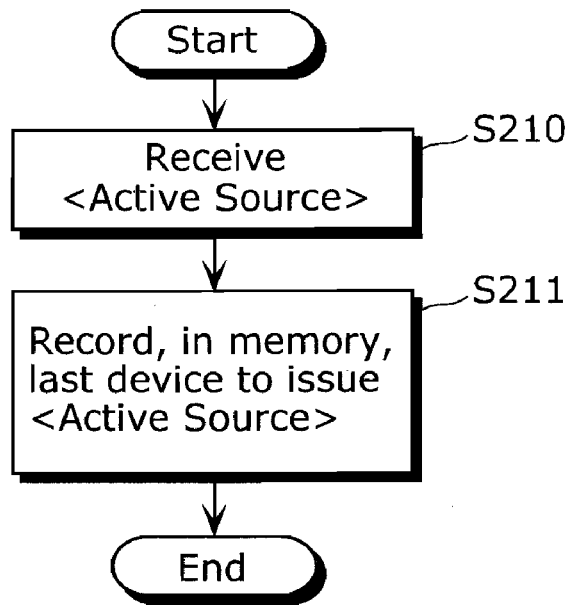
FIG. 12 is a flowchart showing the operation of the set top box in the first embodiment and the second embodiment of the present invention.

FIG. 12 is a flowchart showing the operation of the set top box.

The set top box 2 receives the <Active Source> command (step S210), and stores, in the memory 17, information indicating that the last transmission source of the command is the DVD player 1.

FIG. 8 is a flowchart showing the operation of the set top box.

Next, when the user presses any of the buttons which are the input unit 21, the signal corresponding to the button is transmitted by the controller transmission unit 20, received by the controller reception unit 15, and notified to the microcomputer 16 (step S201).

The microcomputer 16 judges whether or not the signal received in step S201 is a signal of a basic key (step S202).

In the case where it is judged that the signal received in step S201 is a signal of a basic key (basic key in step S202), the microcomputer 16, in the same manner as when operating the set top box 2, refers to the memory 17 and checks whether or not the user is currently viewing the cable television broadcast received by the set top box 2 (step S203).

In the case where the user is not currently watching the cable television received by the set top box 2 (NO in step S203), the microcomputer 16, next, refers to the memory 17 and checks whether or not the television 3 is displaying the GUI menu (step S205).

In the case where the television 3 is not displaying the GUI menu (NO in step S205), the microcomputer 16 refers to the memory 17 and assumes the last device that transmitted the <Active Source> to be the destination of the command (step S206).

The microcomputer 16 transmits, as a second command, a command corresponding to the signal received in step S201, with the device (in this operation example, the DVD player 1: DVD player in step S206) indicated in step S206 as the transmission destination (step S207, FIG. 10).

The DVD player 1 receives, via the television 3, the signal transmitted in step S207, and operates according to the command.

Note that when the last device that transmitted the <Active Source> command is the television 3 (television in step S206), the microcomputer 16 transmits the second command with the television 3 as the transmission destination (step S208, FIG. 10). By carrying out the above-described process, the user is able to operate the DVD player 1 by using the controller 4.

(Operation when Operating the Television)

Hereinafter, the flow of operation of the set top box 2, the television 3, and the DVD player 1 when the user operates the television using the controller shall be described.

FIG. 8 is a flowchart showing the operation of the set top box.

When the user presses any of the buttons which are the input unit 21 of the controller 4, the signal corresponding to the button is transmitted from the controller transmission unit 20, received by the controller reception unit 15, and notified to the microcomputer 16 (step S201).

Note that prior to the process in step S201, an output video of the DVD player 1, a tuner screen of the television 3, or a tuner screen of the set top box 2 may be currently displayed on the display 5 of the television 3.

The microcomputer 16 judges whether the signal received in step S201 is a signal of a basic key, a signal of a television menu display button, or the signal of a set top box-dedicated key (step S202). In the case where the received signal is a signal of a television menu display button (television menu display key in S202), the set top box 2 transmits, as a third command, a command instructing menu-display, with the television 3 as the destination (step S209).

Figure 13:
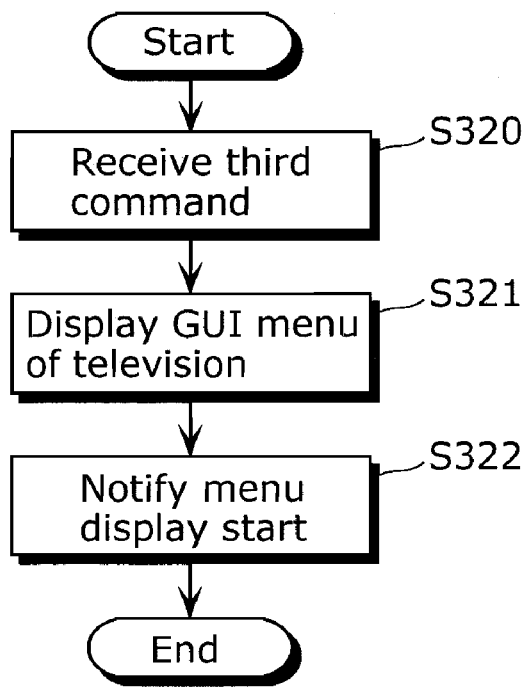
FIG. 13 is a flowchart showing the operation of the television in the first embodiment and the second embodiment of the present invention.

FIG. 13 is a flowchart showing the operation of the television.

Figure 14:
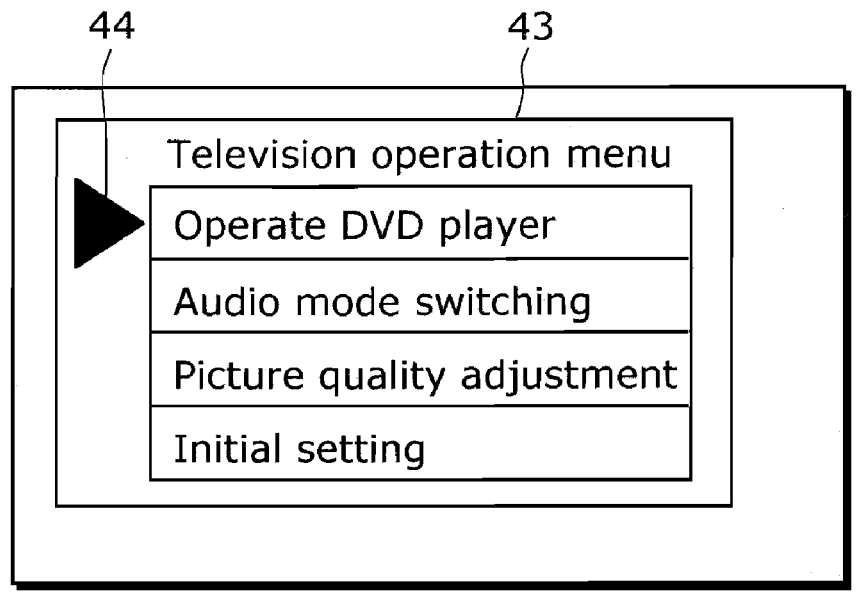
FIG. 14 is a diagram showing an example of a menu screen of a television in the first embodiment and third embodiment of the present invention.

Upon receiving the third command transmitted in step S209 (step S320), the television 3 displays a menu for operating the television 3, as shown in FIG. 14 (step S321).

Furthermore, the television 3 transmits, as a fourth command, a command notifying the start of menu-display, with the set top box 2 as the destination (step S322, FIG. 10).

Figure 15:
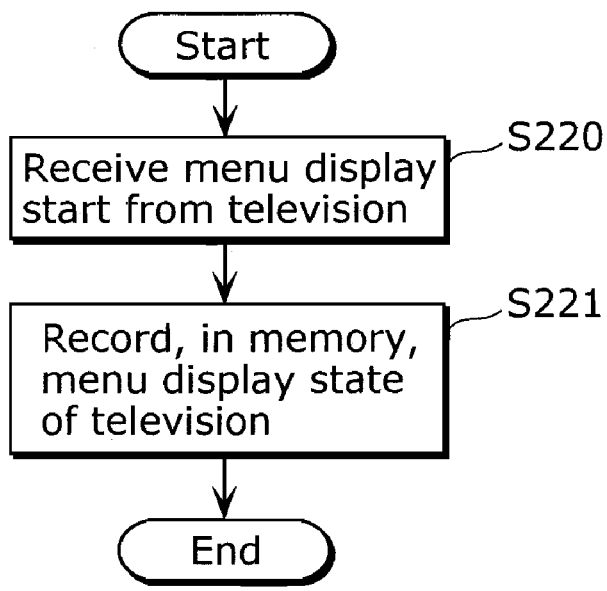
FIG. 15 is a flowchart showing the operation of the set top box in the first embodiment and the second embodiment of the present invention.

FIG. 15 is a flowchart showing the operation of the set top box.

Upon receiving the fourth command transmitted in step S322 (step S220), the set top box 2 stores, in the memory 17, the fact that the television is currently displaying a menu (step S221).

FIG. 8 is a flowchart showing the operation of the set top box.

Subsequently, when the user presses a button which is the input unit 21, the signal corresponding to the button is transmitted by the controller transmission unit 20, received by the controller reception unit 15, and notified to the microcomputer 16 (step S201).

The microcomputer 16 judges whether or not the key corresponding to the signal received in step S201 is a basic key (step S202). When the corresponding key is a basic key (basic key in step S202), the microcomputer 16 refers to the memory 17 and judges whether or not the television is currently displaying a menu (step S205). When the television 3 is currently displaying a menu (YES in step S205), the microcomputer 16 transmits, as the second command, a command corresponding to the basic key, with the television 3 as the destination (step S208, FIG. 10).

Figure 16:
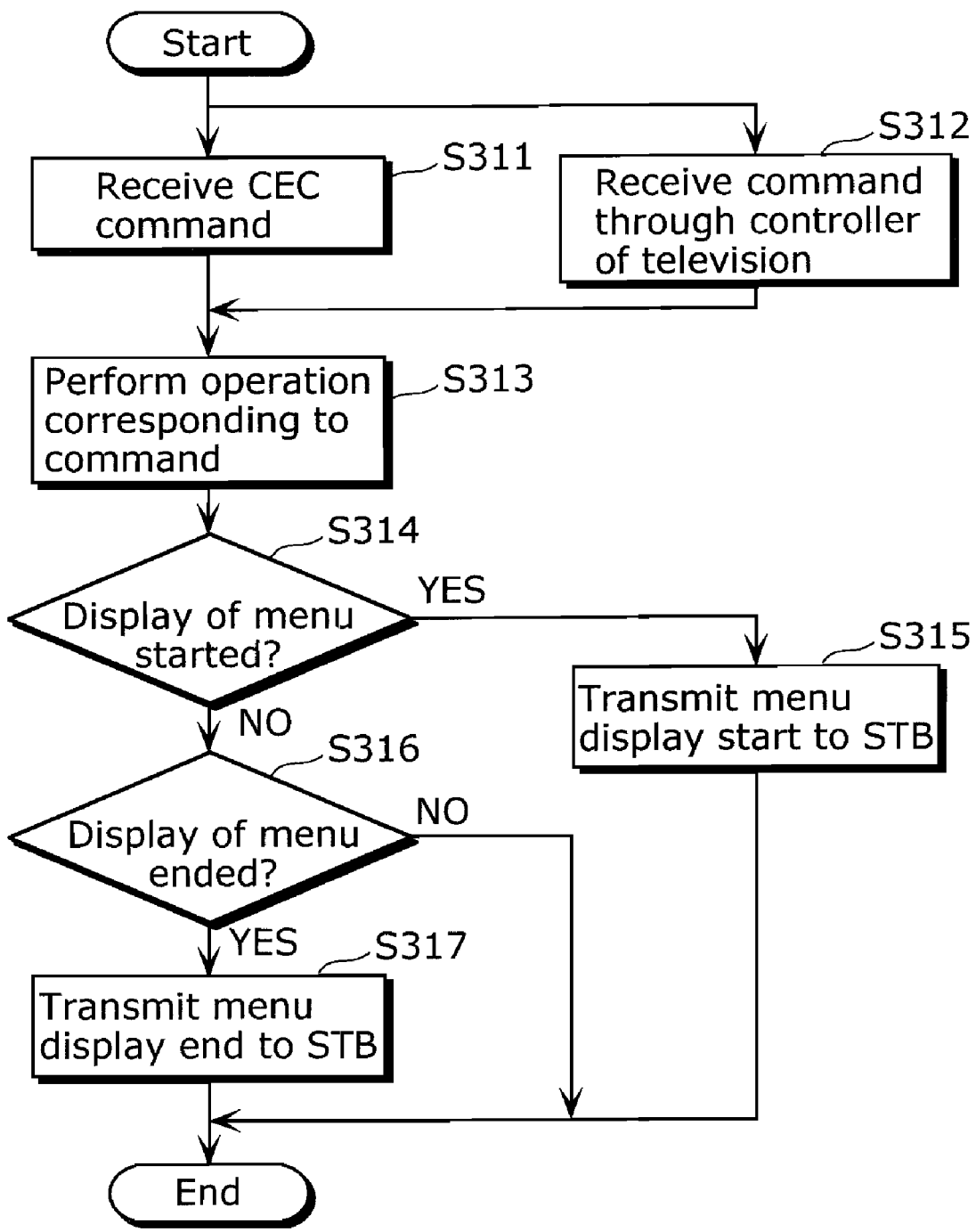
FIG. 16 is a flowchart showing the operation of the television in the first embodiment and the second embodiment of the present invention.

FIG. 16 is a flowchart showing the operation of the television.

When the television receives the command transmitted in step S208 (step S311), the television 3 carries out the operation of the menu, such as moving the cursor, according to the signal (step S313). Furthermore, in the case where the television 3 starts menu-display anew according to the operation in step S313, the television 3 transmits, to the set top box 2, a fourth command indicating the starting of the menu-display (step S315, FIG. 10).

By repeating the above-described operation, the user is able to achieve a desired operation on the menu of the television 3. Furthermore, in the case where the television 3 ends the menu-display (YES in step S316), the television 3 transmits, as a fifth command, a command notifying the end of the menu-display, with the set top box 2 as the destination (step S317, FIG. 10).

Figure 17:
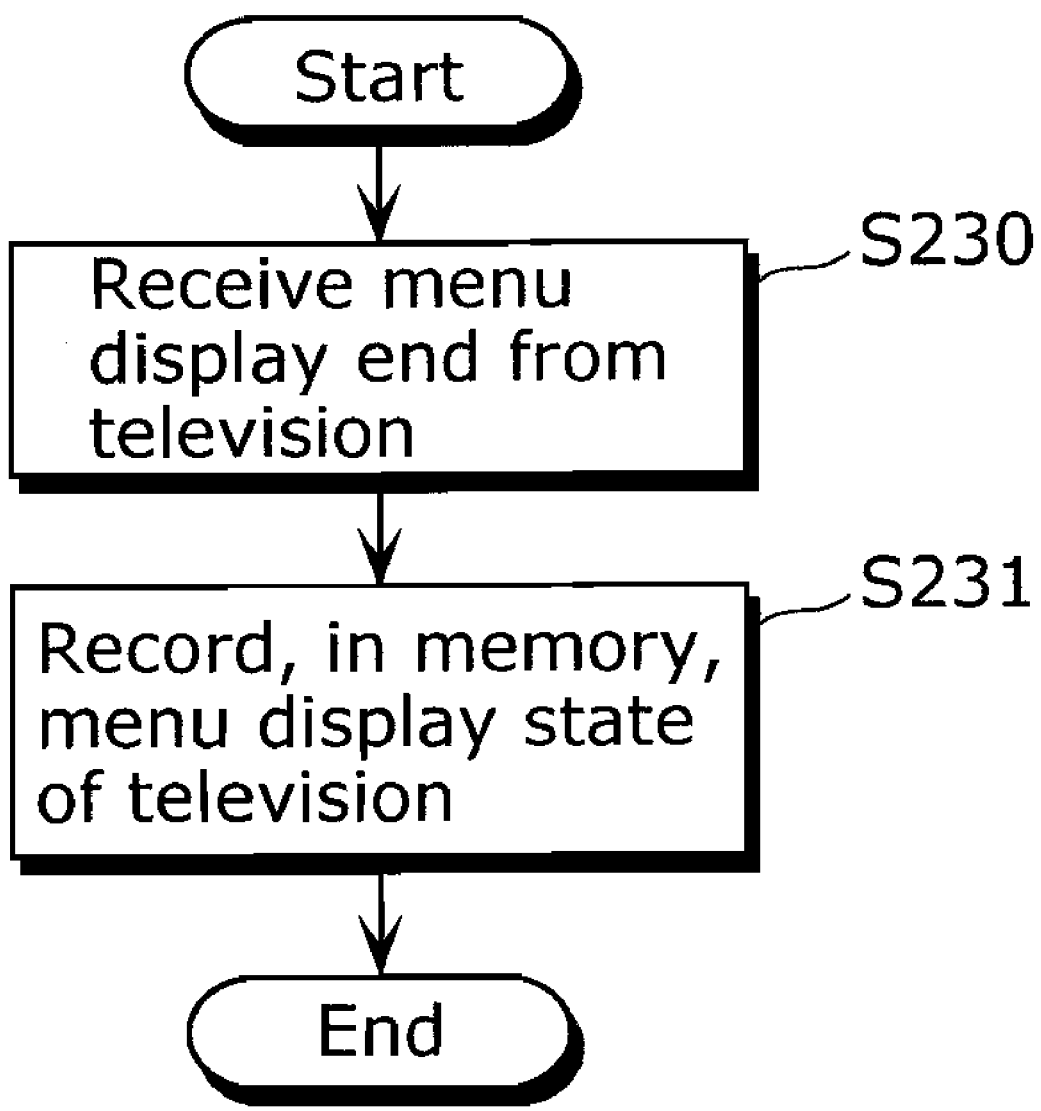
FIG. 17 is a flowchart showing the operation of the set top box in the first embodiment and the second embodiment of the present invention.

FIG. 17 is a flowchart showing the operation of the set top box.

Upon receiving the fifth command (step S230), the set top box 2 stores, in the memory 17, the fact that the television 3 is not currently displaying a menu (step S231).

According to the above-described first embodiment, aside from the set top box 2, it is possible to operate the television 3 and the DVD player 1 using one controller.

As described above, in the remote control system in the first embodiment, the set top box 2 identifies the last device that transmitted the <Active Source> which is the first command, or the command notifying the starting of menu-display which is the fourth command. Furthermore, the set top box 2 transmits, to the identified device, a command corresponding to the signal received from the controller 4. With this, the transmission of the same command to two or more devices is eliminated, and exclusive control of the device executing the command can be performed.

SECOND EMBODIMENT

Through the operation of the controller 4, it is also possible to use the functions programmed into a device connected by the HDMI cable. In other words, through the operation of the controller 4, it is also possible to use the functions programmed into the television 3 and automatically switch the output mode of audio.

Hereinafter, an example of operating an AV amplifier 30 using the functions of the television 3, through the operation of the controller 4 shall be shown.

Note that the second embodiment includes, as is, the configuration and functions in the above-described first embodiment, configurations in the drawings that are the same as that in the first embodiment are given the same numerical reference and their description shall be omitted.

<Configuration>

Figure 18:
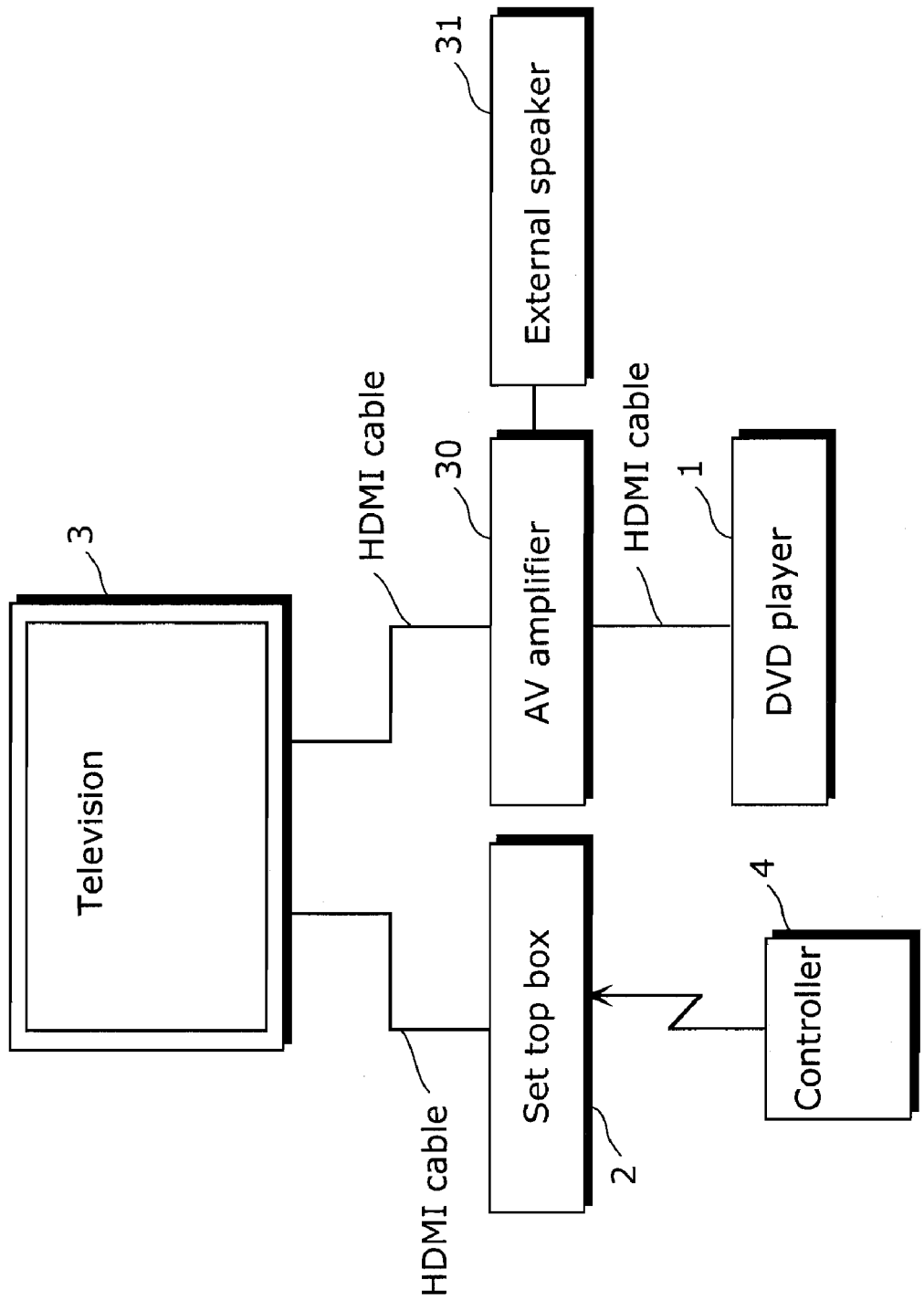
FIG. 18 is a diagram showing the outline configuration of the remote control system in a second embodiment of the present invention.
Figure 19:
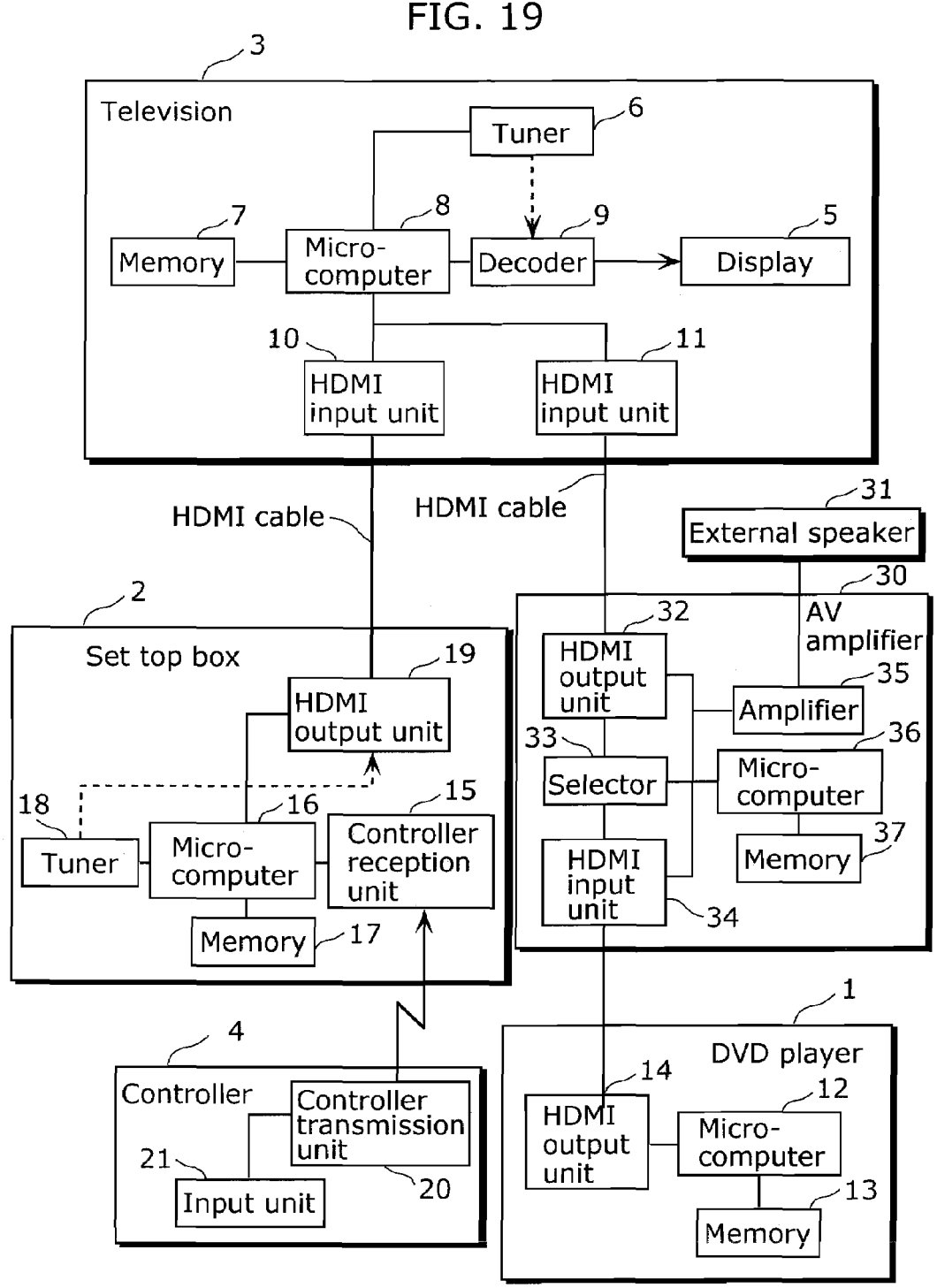
FIG. 19 is a function block diagram of the remote control system in the second embodiment of the present invention.

FIG. 18 is a diagram showing the outline configuration of the remote control system in a second embodiment. Furthermore, FIG. 19 is a function block diagram of the remote control system in the second embodiment.

The remote control system includes the DVD player 1, the set top box 2, the television 3, the controller 4, the AV amplifier 30, and an external speaker 31.

The AV amplifier 30 is connected to the external speaker 31, and includes an HDMI output unit 32, a selector 33, an HDMI input unit 34, an amplifier 35, a microcomputer 36, and a memory 37.

The selector 33 can select an HDMI signal to be outputted to the HDMI output unit 32, from between a signal that can be obtained from the HDMI input unit 34, and another video/audio input signal not shown in the diagram. However, with respect to the CEC bus included in the HDMI, communication is possible regardless of which input is selected by the selector 33, and CEC command-based communication can also be carried out transparently from any HDMI-connected device.

The HDMI input unit 10 of the television 3 and the HDMI output unit 19 of the set top box 2 are connected by an HDMI cable in the same manner as in the first embodiment. Furthermore, the television 3 and the HDMI output unit 32 of the AV amplifier are connected by an HDMI cable, and the DVD player 1 is connected to the HDMI input unit 34 of the AV amplifier by the HDMI cable.

Note that in the present embodiment, the audio of the DVD player 1 is transferred to the AV amplifier 30 through the HDMI cable. Since CEC is a bus connection, it is possible to connect devices, aside from the above-described connection, as long as it is within the scope allowed in the HDMI 1.2a standard.

<Operation>

The menu of the television 3 is displayed as described (in the operation when operating the television) in the first embodiment.

As described (in the operation when operating the television) in the first embodiment, the user selects a button for "mode switching" which is a menu of the television 3.

A mode switching program that is programmed into a ROM of the television 3 is executed. In other words, in the case where the audio output mode is switched from a television mode to a theater mode, the remote control system performs the following series of operations.

The television 3 transmits a CEC command to the AV amplifier 30, and checks whether or not the AV amplifier 30 is ON. In the case where the AV amplifier 30 is not ON, the television 3 transmits a command instructing the turning ON of power supply, to the AV amplifier 30.

Next, the television 3 mutes the built-in speaker and transmits, to the amplifier 30, a command instructing the outputting of the audio of a currently reproducing device from the external speaker 31.

According to the above-described series of operations, in the case where the DVD player 1 is currently reproducing, the audio of the DVD player 1 is outputted from the external speaker 31 connected to the AV amplifier 30.

Note that although the embodiment of the present invention is described with the HDMI cable being used in the connection of the respective devices, and the CEC command being used as a command for the mutual controlling by the devices, the present invention can be implemented, aside from the aforementioned embodiment, as long as the devices are connected to allow mutual communication.

THIRD EMBODIMENT

Hereinafter, embodiments of the present invention shall be described with reference to the drawings.

Figure 20:
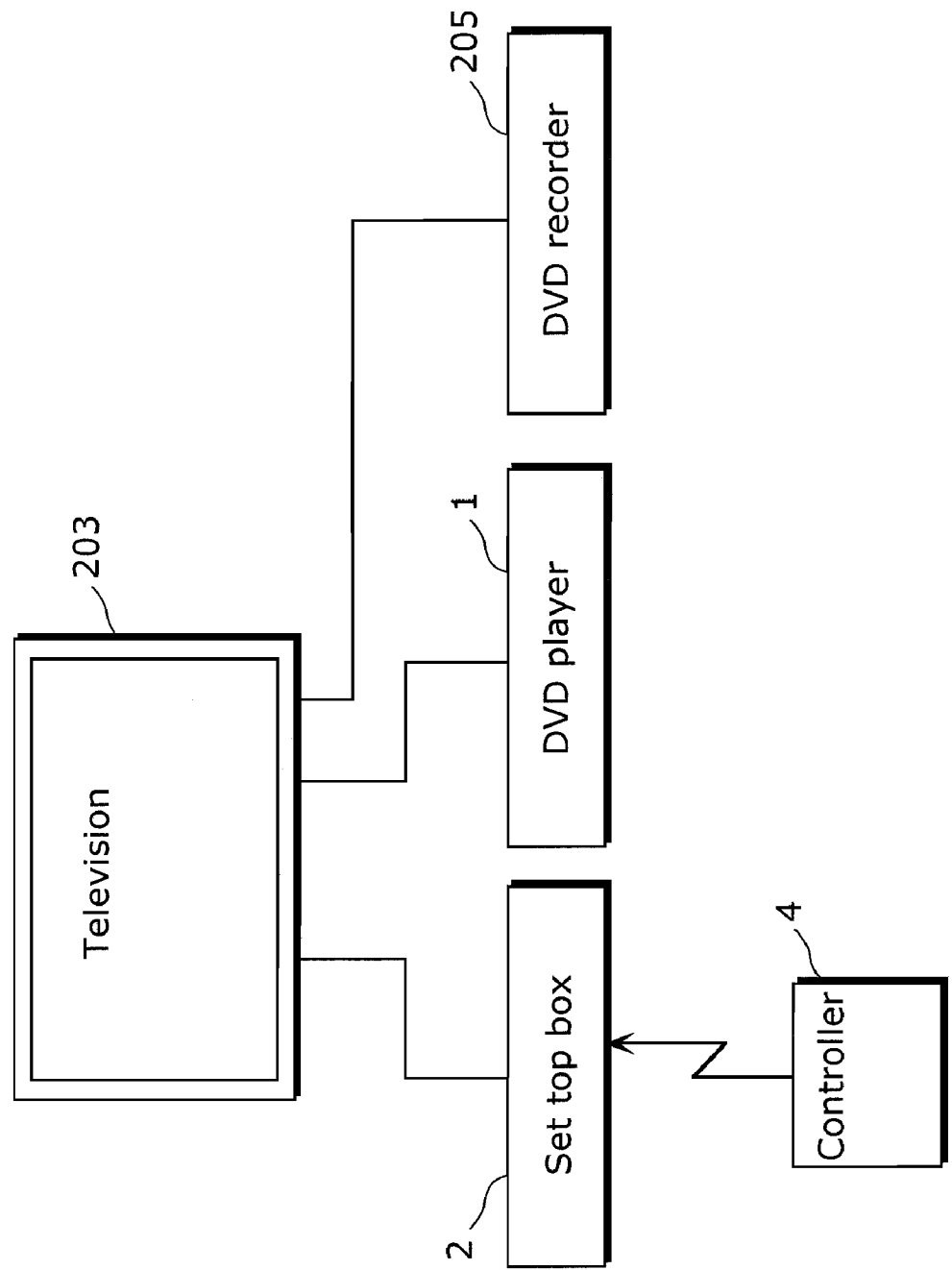
FIG. 20 is a diagram showing the outline configuration of the remote control system in a third embodiment of the present invention
Figure 21:
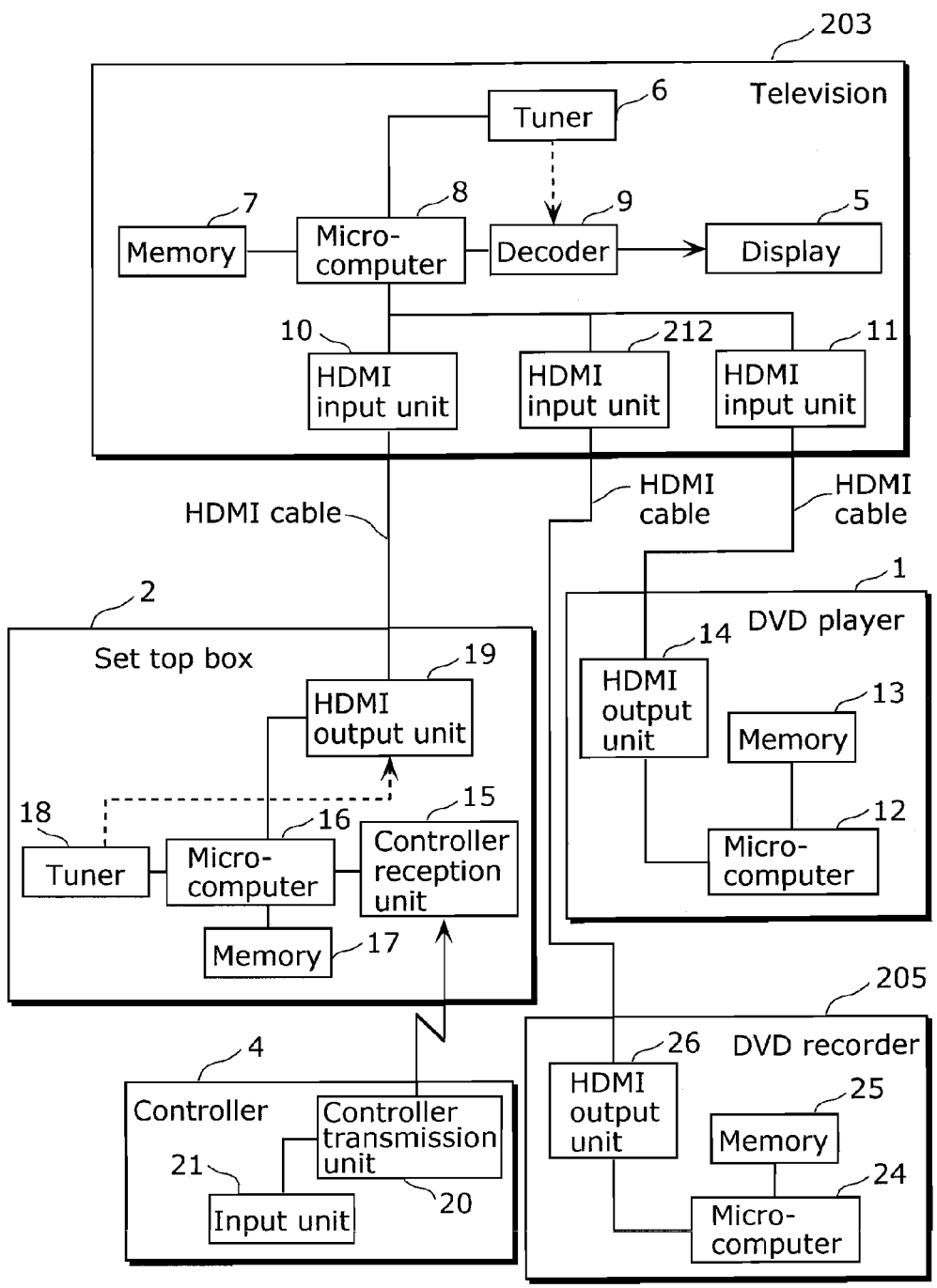
FIG. 21 is a function block diagram of the remote control system in the third embodiment of the present invention.

FIG. 20 is an external view of the remote control system in a third embodiment. Furthermore, FIG. 21 is function block diagram of the remote control system in the third embodiment.

Note that the DVD player 1 and a DVD recorder 205 in the third embodiment are examples of the second video output apparatus, the set top box 2 is an example of the first video output apparatus, and a television 203 is an example of the video display apparatus.

As shown in FIG. 20, the remote control system includes the DVD player 1, the set top box 2, the television 203, the controller 4, and the DVD recorder 205.

The DVD player 1 is a device which decodes video content recorded on a DVD, and outputs video and audio via the HDMI cable.

The set top box 2 is a device which outputs video and audio of a cable television broadcast, via the HDMI cable.

The television 203 is a device for outputting video and audio outputted from a device connected via the HDMI cable.

The controller 4 is a device which transmits a signal mainly to the set top box 2.

The television 203 and the set top box 2 are connected by the HDMI cable, and the video and audio decoded by the set top box 2 are transmitted to the television 203 through the HDMI cable.

Furthermore, the television 203 and the DVD player 1 are also connected by the HDMI cable, and the video and audio played back by the DVD player 1 are also transmitted to the television 3 in the same manner as with the set top box 2.

Furthermore, the television 203, the set top box 2, and the DVD player 1 can transmit and receive CEC commands to and from each other via a CEC bus of the HDMI cable. The line of the CEC bus is included inside the tube of the HDMI cable together with the line for transmitting video and audio, and connection of the CEC bus is also carried out through the connection between devices using the HDMI cable.

As shown in FIG. 21, the television 203 is an example of the video display apparatus, and includes the display 5, the tuner 6, the memory 7, the microcomputer 8, the decoder 9, the HDMI input unit 10, an HDMI input unit 212, and the HDMI input unit 11.

The display 5 displays video, menus, and so on, obtained from the decoder 9.

The microcomputer 8 interprets a CEC command or a command according to the operation of a controller of the television 203, and performs various processes. Furthermore, the microcomputer 8 also controls the decoder 9 and the tuner 6 as necessary. Furthermore, the microcomputer 8 includes: a classification unit which classifies, based on the state of its own apparatus, whether or not a CEC command received from another apparatus via the CEC bus is a command addressed to its own apparatus; and a command execution unit which executes the CEC command received via the CEC bus in the case where the classification unit classifies the CEC command as a command addressed to its own apparatus, and which does not execute the command received through the CEC bus in the case where the CEC command is classified as a command addressed to another apparatus.

The tuner 6 receives a television broadcast wave received through an antenna not shown in the diagram and, when the broadcast received is a digital broadcast, for example, sends the data thereof to the decoder 9.

The decoder 9 decodes video and audio from the broadcast wave obtained by the tuner 6, converts the result into an appropriate signal for displaying on the display 5, and sends the signal to the display 5. Furthermore, the decoder 9 also converts video obtained from the HDMI input unit 10, the HDMI input unit 212, the HDMI input unit 11, and other external video inputs not shown in the diagram, into an appropriate signal for displaying on the display 5, and sends the signal to the display 5.

The HDMI input units 10, 211 and 11 are connected to the HDMI output unit 19 of the set top box 2, the HDMI output unit 14 of the DVD player 1, and an HDMI output unit 26 of the DVD recorder 205, respectively, and receive an HDMI signal. Furthermore, together with the reception of HDMI signals, the HDMI input units 10, 212, and 11 perform the transmission and reception of CEC commands.

A CEC unit of the HDMI input units 10, 212, and 11 are bus-connected, and mutually transmit and receive CEC commands between the set top box 2, the DVD player 1, and the DVD recorder 205 connected to HDMI input units 10, 212, and 11.

The DVD player 1 includes the microcomputer 12, the memory 13, and the HDMI output unit 14; reads a signal recorded on a DVD, using a DVD reading device not shown in the diagram; decodes video or still images, and audio; and outputs video and audio, as HDMI signals, through the HDMI output unit 14.

The microcomputer 12, while using the memory 13: controls the DVD reading device not shown in the diagram; processes inputs from an input unit not shown in the diagram, included in the DVD player 1; and controls the HDMI output unit 14. Furthermore, the microcomputer 12 also instructs the decoding upon receiving a CEC command received by the HDMI output unit 14, and the outputting of a CEC command to the HDMI output unit 14. Furthermore, the microcomputer 12 includes: a notification unit which, at the time of operation of its own apparatus, instructs the outputting of a CEC command <Active Source> which is a state recognition command broadcasted to the set top box 2 and the television 203; a classification unit which classifies, based on the state of its own apparatus, whether or not a CEC command received from another apparatus via the CEC bus is a command addressed to its own apparatus; and a command execution unit which executes the CEC command received via the CEC bus in the case where the classification unit classifies the CEC command as a command addressed to its own apparatus, and which does not execute the command received through the CEC bus in the case where the CEC command is classified as a command addressed to another apparatus.

The HDMI output unit 14 outputs video and audio decoded by the DVD reading device, as HDMI signals, to the HDMI input unit 11. Furthermore, together with the transmission of HDMI signals, the HDMI output unit 14 also performs communication of CEC commands.

The set top box 2 includes the controller reception unit 15, the microcomputer 16, the memory 17, the tuner 18, and the HDMI output unit 19.

The microcomputer 16, while using the memory 17: controls the tuner 18; processes inputs from another input unit not shown in the diagram, included in the set top box 2; and controls the HDMI output unit 19. Furthermore, the microcomputer 16 also instructs, when the HDMI output unit 19 receives a command, the decoding of the CEC command, and the outputting of a CEC command to the HDMI output unit 19. Furthermore, the microcomputer 16 includes: a recognition unit which, upon receiving a CEC command <Active Source>, records the transmission source device of the command in the memory 17, and recognizes the operational state; a classification unit which classifies a command inputted with the controller 4; and a transfer unit which, in the case where the classification unit classifies that the command is a dedicated command for the television 203, transfers the dedicated command to the television 203 and, in the case where the command is classified as a common command that can be run commonly among plural devices connected to the CEC bus, transfers, via the CEC bus, to the television 203, and the DVD player 1 or the DVD recorder 205 which is in the operational state a command in which the common command is attached with a code indicating the television 203 as the transmission destination, and a command in which the common command is attached with a code having the DVD player 1 or the DVD recorder 205 which is in the operational state as the transmission destination, respectively.

The tuner 18 receives and decodes a cable television broadcast signal, and transmits video and audio to the HDMI output unit 19.

The HDMI output unit 19 outputs video and audio decoded by the tuner 18, as HDMI signals, to the HDMI input unit 10. Furthermore, the HDMI output unit 19 also transmits and receives CEC commands.

The controller reception unit 15 receives a signal transmitted from the controller 4 through a wireless communication means such infrared rays and radio waves, and sends a result of the decoding of such signal to the microcomputer 16.

The controller 4 includes the controller transmission unit 20 and the input unit 21.

The input unit 21 is configured of any or a combination of, for example, a push button, a toggle switch, an arrow key, a joystick, and so on.

The controller transmission unit 20 transmits a signal corresponding to the input obtained through the input unit 21, to the controller reception unit 15, using a wireless communication means such as infrared rays or radio waves.

The DVD recorder 205 includes the microcomputer 24, the memory 25, and the HDMI output unit 26; reads a signal recorded on a DVD, using a DVD reading device not shown in the diagram; decodes video or still images, and audio; and outputs video and audio, as HDMI signals, through the HDMI output unit 26.

The microcomputer 24, while using the memory 25: controls the DVD reading device not shown in the diagram; processes inputs from an input unit not shown in the diagram, included in the DVD recorder 205; and controls the HDMI output unit 26. Furthermore, the microcomputer 24 also instructs the decoding upon receiving a CEC command received by the HDMI output unit 26, and the outputting of a CEC command to the HDMI output unit 26. Furthermore, the microcomputer 24 includes: a notification unit which, at the time of operation of its own apparatus, instructs the outputting of a CEC command <Active Source> which is a state recognition command to the set top box 2 and the television 203; a classification unit which classifies, based on the state of its own apparatus, whether or not a CEC command received from another apparatus via the CEC bus is a command addressed to its own apparatus; and a command execution unit which executes the CEC command received via the CEC bus in the case where the classification unit classifies the CEC command as a command addressed to its own apparatus, and which does not execute the command received through the CEC bus in the case where the CEC command is classified as a command addressed to another apparatus.

The HDMI output unit 26 outputs video and audio decoded by the DVD reading device, as HDMI signals, to an HDMI input unit 212. Furthermore, together with the transmission of HDMI signals, the HDMI output unit 26 also performs communication of CEC commands.

Next, the operation of the remote control system when a user performs an operation using a controller, in the third embodiment of the present invention, shall be described using FIG. 22 to FIG. 30.

(Operation when Set Top Box is Connected)

When the set top box 2 and the television 203 are connected by the HDMI cable, the set top box 2 receives information including a physical address by making an inquiry to the television 203, through DDC communication included in HDMI.

In the case where there is no reply even when DDC communication is attempted by the set top box 2, the set top box 2 assumes that the television is unconnected, and terminates the command transfer function according to the present invention. When successful in receiving the physical address, the set top box 2 transmits a <Polling Message> command with the logical address of the set top box as destination, establishes a logical address when there is no reply, and transmits a <Report Physical Address> command addressed to all the devices.

(Operation when DVD Player 1 and DVD Recorder 205 are Connected)

When connected with the television 203 by the HDMI cable, the DVD player 1 and the DVD recorder 205 receive information including a physical address by making an inquiry to the television 203, through DDC communication included in HDMI. When successful in receiving the physical address, the DVD player 1 and the DVD recorder 205 transmit a <Polling Message> command with the logical address of the respective devices as destinations, establish a logical address when there is no reply, and transmit a <Report Physical Address> command addressed to all the devices. When there is a reply to the <Polling Message>, a device having the same address already exists, and thus the DVD player 1 and the DVD recorder 205 transmit a <Polling Message> command again to another logical address. When unable to obtain a unique logical address, the DVD player 1 and the DVD recorder 205 terminate functions with regard to CEC commands, and do not receive and transmit a CEC command until they are able to obtain a logical address through the changing of the connection configuration, and so on.

Upon receiving a <Report Physical Address> command, the set top box 2 records the transmission source device's logical address and physical address in the memory 17.

(Operation when Operating the Set Top Box)

Figure 22:
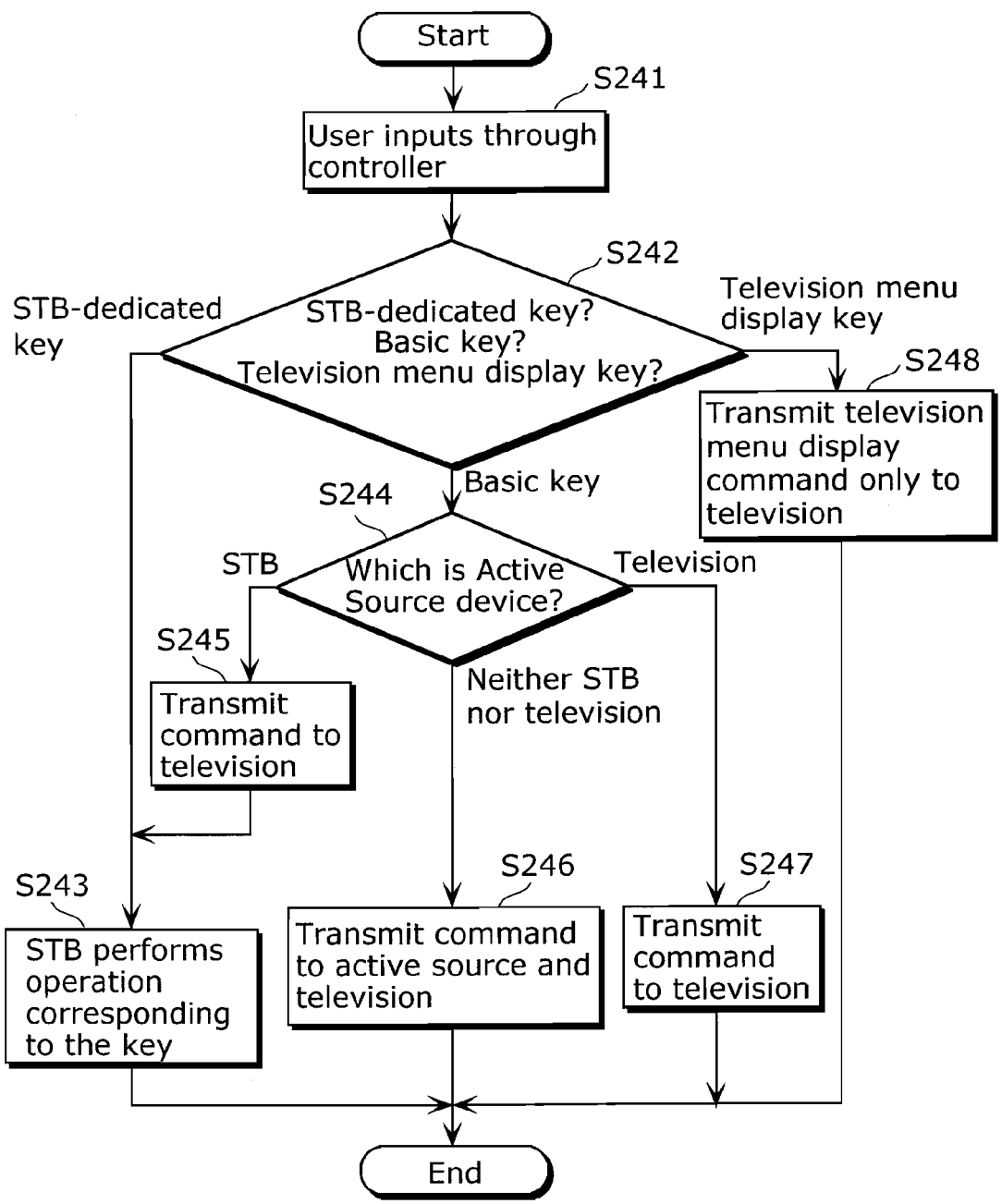
FIG. 22 is a flowchart showing the operation of the set top box in the third embodiment of the present invention.

The flow of operations when the user operates the set top box 2 by using the controller 4 shall be described using FIG. 22.

First, when the user presses any of buttons which are the input unit 21 of the controller 4, the signal corresponding to the button is transmitted, received by the controller reception unit 15, notified to the microcomputer 16, and notified to the microcomputer 16 (step S241).

The microcomputer 16 judges whether the key corresponding to the signal receiving in step S241 is a predetermined key that is common to other devices, such as "UP", "DOWN, "LEFT", "RIGHT", "ENTER", and so on (hereafter called a "basic key"), a key which only operates on the television 203, or a key which only operates on the set top box 2 (step S242). The judgment of the signal received in step S241, in step S242, is performed with reference to a table such as that shown in FIG. 23.

In the case where it is judged that the signal received in step S241 is a signal of a dedicated key for operating the set top box 2 (STB dedicated key in step S242), the set top box 2 performs the process corresponding to the signal of the key (step S243). In the case where, for example, the key received in step S241 is a key corresponding to a channel of a cable television broadcast, the tuner 18 of the set top box 2 receives the set channel, and the HDMI output unit 19 outputs the video and audio of the channel.

In the case where it is judged in step S242 that the received signal is a signal of a basic key (a common command), the microcomputer 16 refers to the memory 17 and checks for the last device that transmitted an <Active Source> command (hereafter called "active source device") (step S244).

When, in step S244, the active source device is the set top box 2 (STB in step S244), the set top box 2 transmits a CEC command corresponding to the signal received in step S241 to the television 203 (step S245), and the operation corresponding to the signal is also executed by the set top box 2. However, in step S242, when the set top box 2 is not displaying a menu, the set top box 2 does not execute the operation corresponding to the signal.

Note that in the case where the signal received in step S241 is a signal which only operates on the set top box, and is a signal which activates a menu built-into the set top box 2 or a signal instructing the viewing of a cable television broadcast received by the set top box 2, the set top box 2 transmits an <Active Source> command.

In this manner, the user can operate the set top box 2 in the present remote control system, by using the controller 4.

Furthermore, when the user presses a television menu display button which is the input unit 21 of the controller 4, the signal corresponding to the button is transmitted by the controller transmission unit 20, received by the controller reception unit 15, and notified to the microcomputer 16 (step S241).

Note that prior to the process in step S241, the output video of the DVD player 1, the tuner screen of the television 203, or the tuner screen of the set top box 2 may be currently displayed on the display 5.

The set top box 2 judges whether the signal received in step S241 is a signal of a basic key, a signal of a television menu display button, or the signal of a set top box-dedicated key (step S242). In the case where the received signal is a signal of the television menu display button (television menu display key in S242), the set top box 2 transmits a command instructing television menu-display, with the television 203 as the destination (step S248, FIG. 24).

Figure 25:
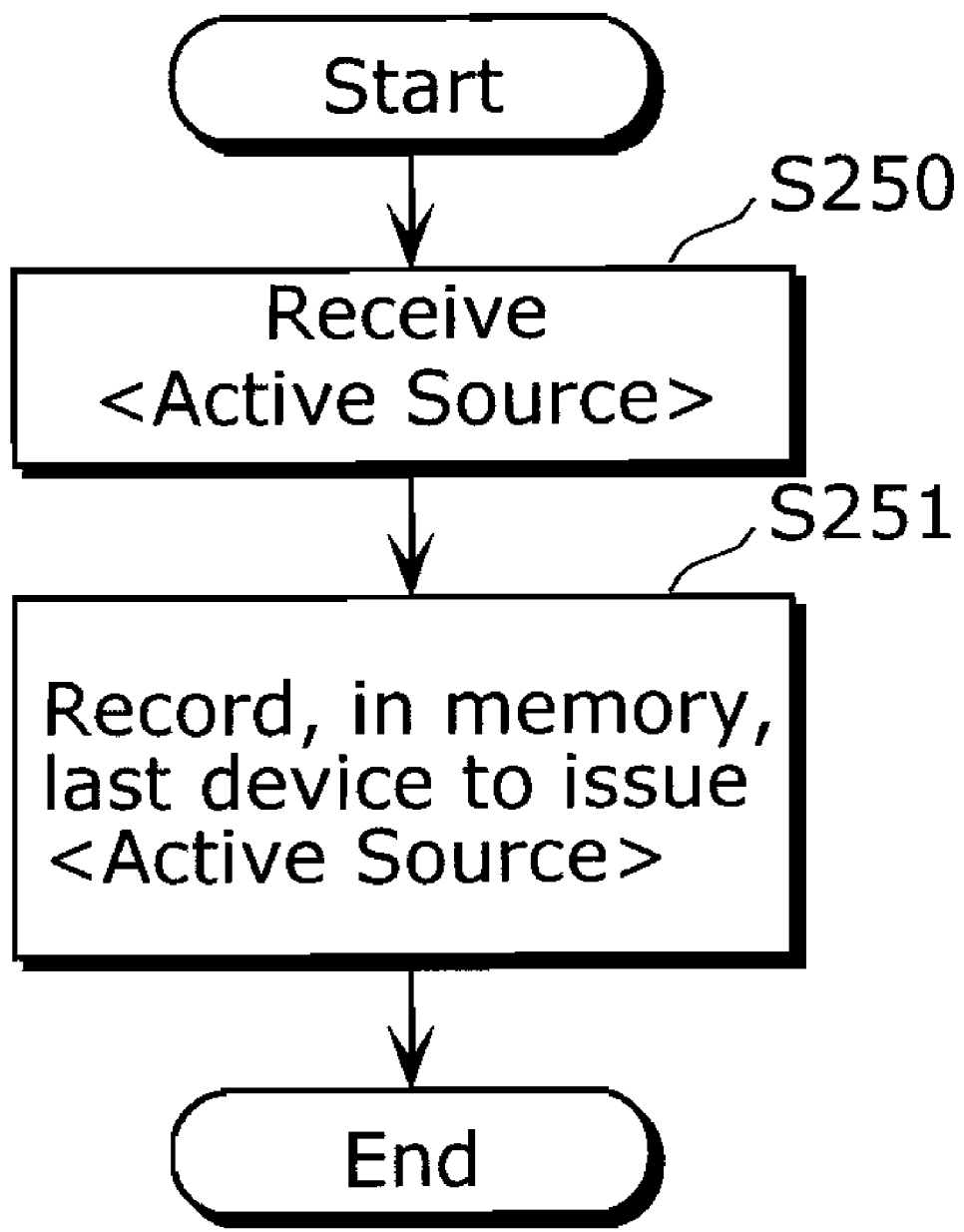
FIG. 25 is a flowchart showing the operation of the set top box in the third embodiment of the present invention.

Furthermore, in the case where a device other than the set top box 2 transmits an <Active Source> command and becomes the active source, the set top box operates in the following manner. First, as shown in FIG. 25, the set top box 2 which receives the transmitted <Active Source> command (step S250), stores, in the memory 17, the logical address of the device which is the transmission source of the command, as information indicating the current transmission source device (step S251).

Next, in the case where the user operates the controller 4 so that a signal corresponding to a basic key is outputted from the controller 4, and the signal is received by the set top box 2 (basic key in step S242), the set top box 2 refers to the memory 17 for the device which is the active source device (step S244).

Figure 24:
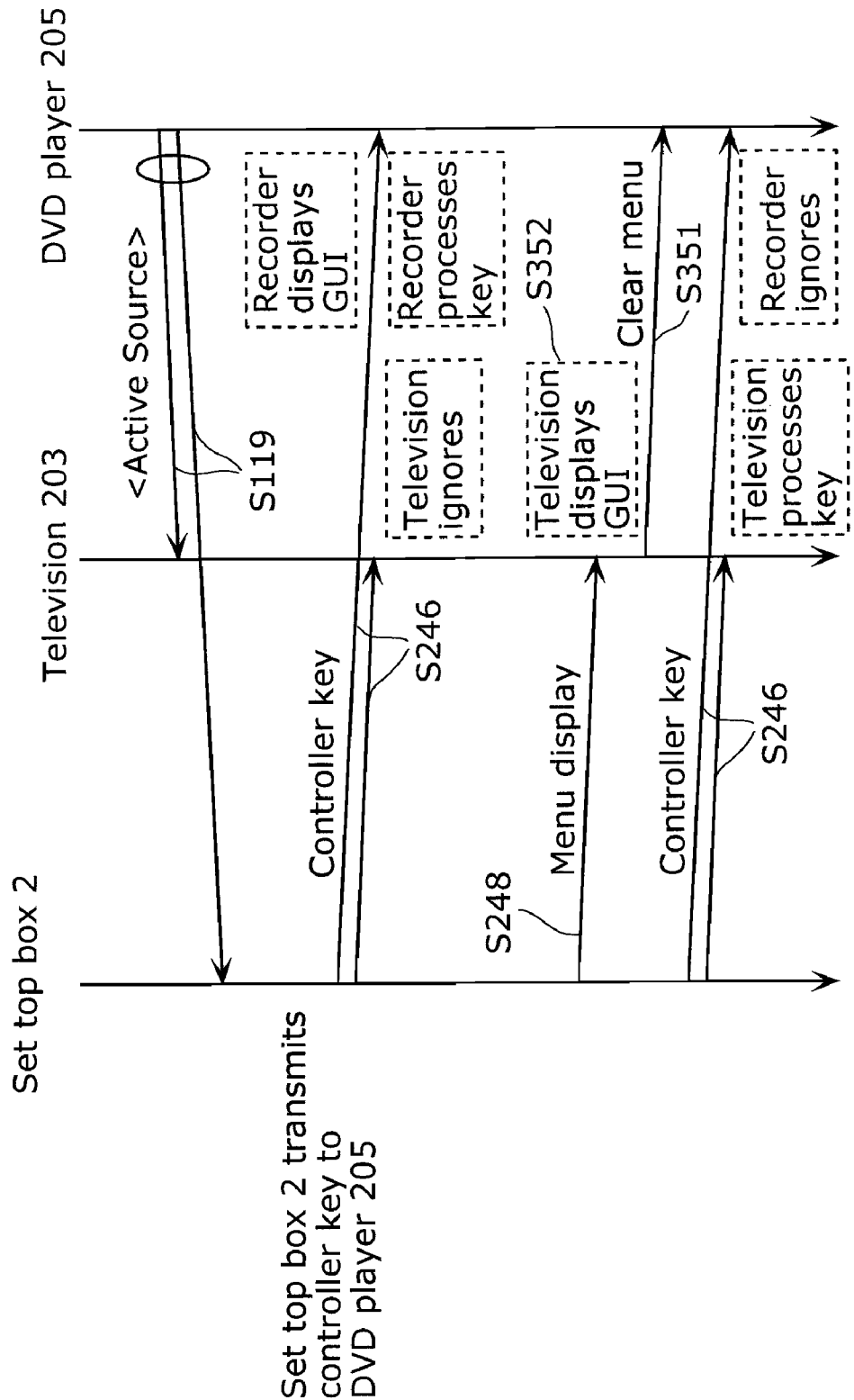
FIG. 24 is a diagram showing the operation of the remote control system in the third embodiment of the present invention.

In the case where the active source device is neither the set top box 2 nor the television 203 (neither STB nor television in step S244), for example, the case where the active source device is the DVD player 1, the set top box 2 transmits a CEC command to the DVD player 1, which is the active source device, and the television 203 (step S246, FIG. 24). The two commands transmitted in step S246, though having different destination devices, are commands with the same operating code and operand. However, since devices other than the television 203 and the DVD player 1 are not included in the destination, the commands have absolutely no effect on the other devices. Note that, in step S246, the set top box 2 refers to the table shown in FIG. 23, and determines the CEC command corresponding to the signal received in step S241.

When, in step S244, the active source device is the television 203 (television in step S244), the controller 4 refers to the table shown in FIG. 23 and transmits a CEC command corresponding to the signal received in step S241 to the television 203 (step S247).

(Operation when Operating the DVD Player 1)

Hereinafter, the flow of operations of the set top box 2, the television 203, and the DVD player 1, when the user operates the DVD player 1 by using the controller 4 shall be described.

Figure 26:
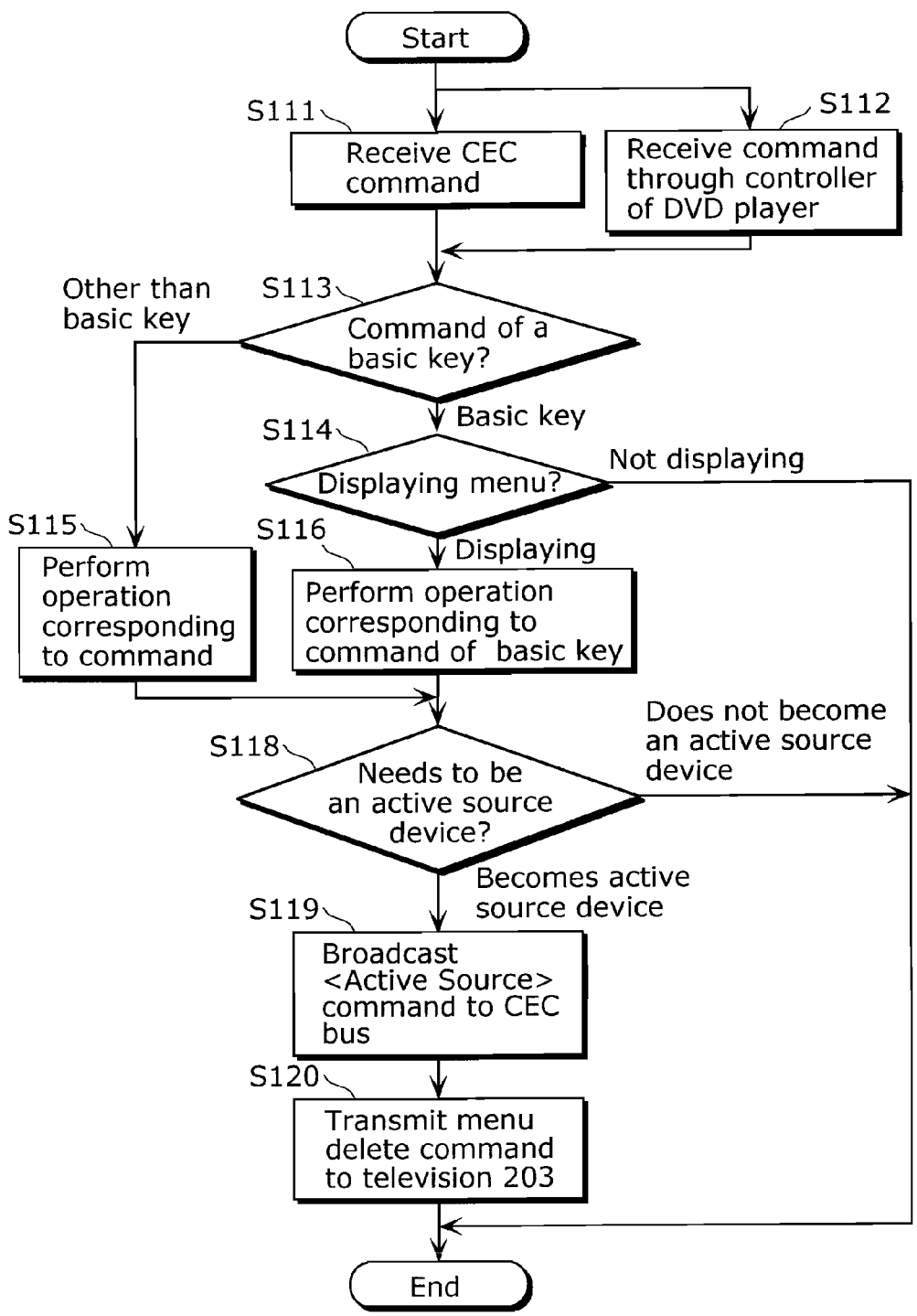
FIG. 26 is a flowchart showing the operation of the DVD player and a DVD recorder in the third embodiment of the present invention.

FIG. 26 is a flowchart showing the operation of the DVD player 1 and the DVD recorder 205.

Figure 27:
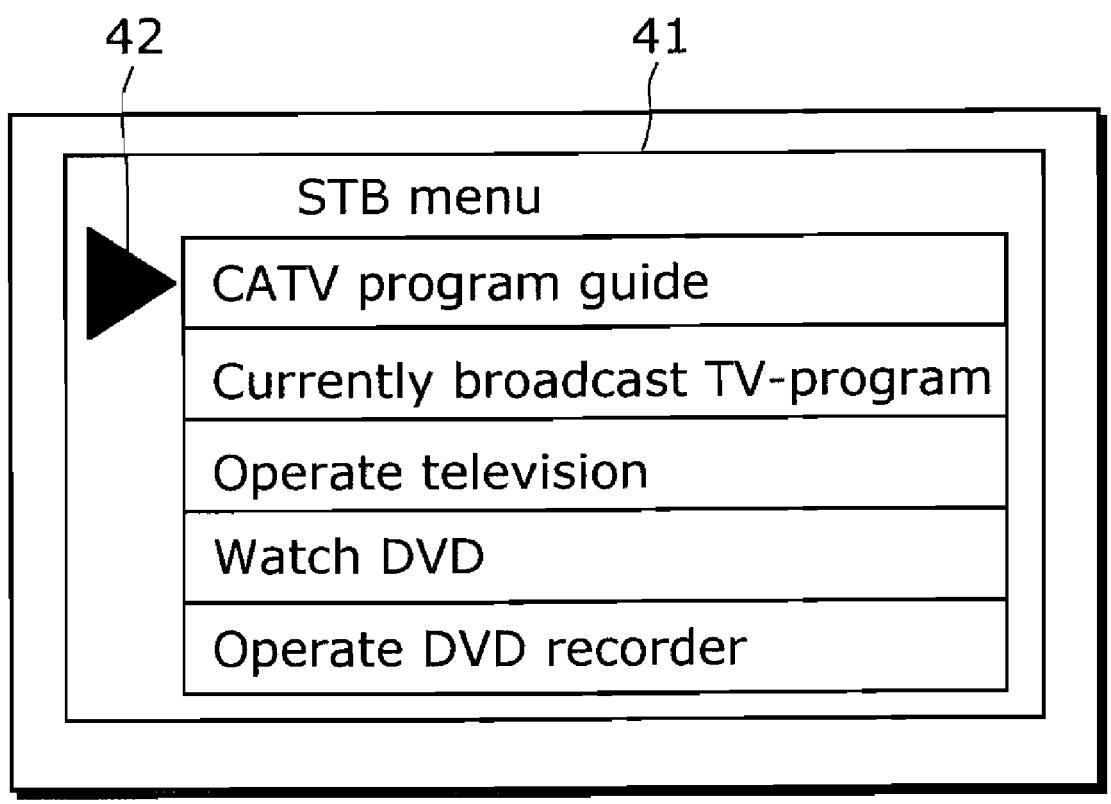
FIG. 27 is a diagram showing an example of a menu screen of the set top box in the third embodiment of the present invention.

The user, while looking at a menu generated by the microcomputer 16 of the set top box 2 as shown in FIG. 27 for example, can move the item indicated by the cursor 42 and execute a desired program built-into the set top box 2 by operating the controller 4. For example, in the case where the user selects a menu item called "watch DVD", the microcomputer 16 of the set top box 2 executes a program which activates the DVD player 1 and starts the playback of a DVD. In the program, a command instructing the turning of power ON and a command for starting the playback of the DVD are transmitted to the DVD player 1 as CEC commands.

Upon receiving the CEC commands (step S111), the DVD player 1 judges whether or not the commands received in step S111 are commands of a basic key (step S113).

In the case where the commands received in step S111 are commands other than those of a basic key (other than basic key in step S113), the DVD player executes the operation corresponding to the commands (step S115).

In the case where, in step S115, the command received in step S111 is, for example, the command instructing the turning of the power ON, the DVD player 1 shifts from a stand-by state to a power ON state. Furthermore, in the case where the command received in step S111 is the command for starting the playback of the DVD, the DVD player 1 starts the playback of the DVD.

Furthermore, upon receiving a signal from an input unit of the DVD player 1, which is not shown in the diagram (step S112), the DVD player 1 operates, in response to the signal received in step S112, in the same manner as when receiving the command in step S111. In other words, in the case where the signal received in step S112 is a signal instructing the playback of the DVD, the DVD player 1 starts the playback of the DVD in the same manner in step S115.

Next, the DVD player 1 judges whether the operation in step S115 or step S116 is an operation for becoming an active source. An "operation for becoming an active source" is an operation programmed beforehand in the DVD player 1, in which a source device starts the output of video and audio according to the operation by the user. For example, there is the operation to start the playback of a DVD, or the operation to start the display of a menu of a DVD.

In the case where the DVD player 1 needs to become an active source device (become an active source in step S118), the DVD player 1 broadcasts an <Active Source> command to all devices connected by the CEC bus. The television 3 receiving the <Active Source> command switches the video and audio input to the terminal to which the DVD player 1 is connected.

When the DVD player 1 broadcasts the <Active Source> (step S119, FIG. 24), when the user presses a button which is a basic key of the controller 4, a command corresponding to the basic key is transmitted from the set top box 2, with the DVD player 1 as the destination.

Subsequently, the DVD player 1 transmits a CEC command instructing menu deletion, to the television 203 (step S120).

The DVD player operates in the following manner in the case of receiving a command corresponding to a basic key.

In the case where the command received in step S111 is judged as a basic key in step S113 (basic key in step S113), the DVD player 1 refers to the memory 13 and checks whether or not the DVD player 1 is displaying a menu (step S114).

In the case where the DVD player 1 is not displaying a menu in step S114 (not displaying in step S114), the process ends without any particular operation being carried out (step S117).

In the case where the DVD player 1 is displaying a menu in step S114 (displaying in step S114), the DVD player 1 performs the operation corresponding to the command (step S116). For example, in the case where the received command is a command corresponding to the UP key included in the basic keys, the DVD player 1 moves the cursor for the menu generated by the microcomputer 12 one item up. Furthermore, for example, in the case where the received command is for the ENTER key included in the basic keys, the DVD player 1 executes the function corresponding to the item on which the cursor for the menu generated by the microcomputer 12 is focused.

(Operation when Operating the Television 203)

Hereinafter, the flow of operation of the set top box 2, the television 203, and the DVD player 1 when the user operates the television 203 using the controller 4 shall be described.

FIG. 22 is a flowchart showing the operation of the set top box 2.

Figure 28:
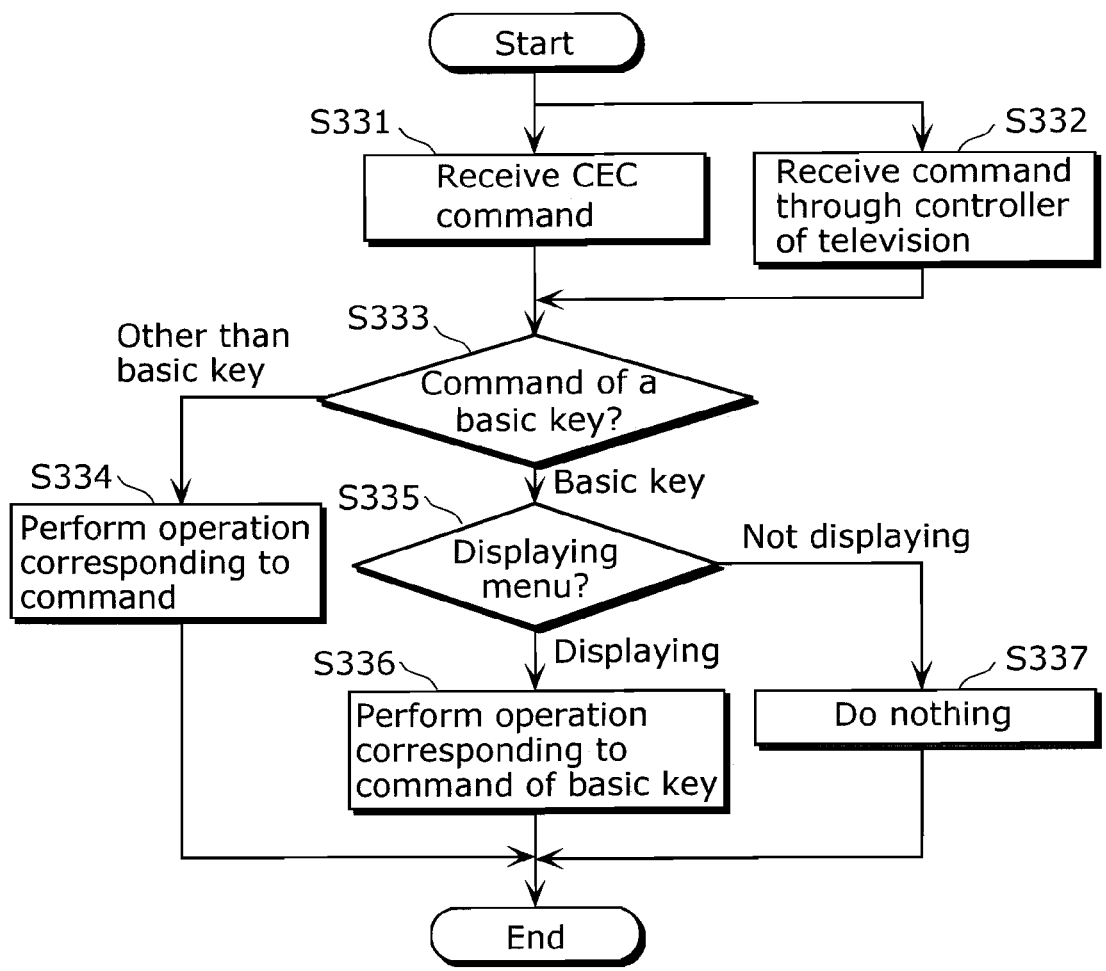
FIG. 28 is a flowchart showing the operation of the television in the third embodiment of the present invention.
Figure 29:
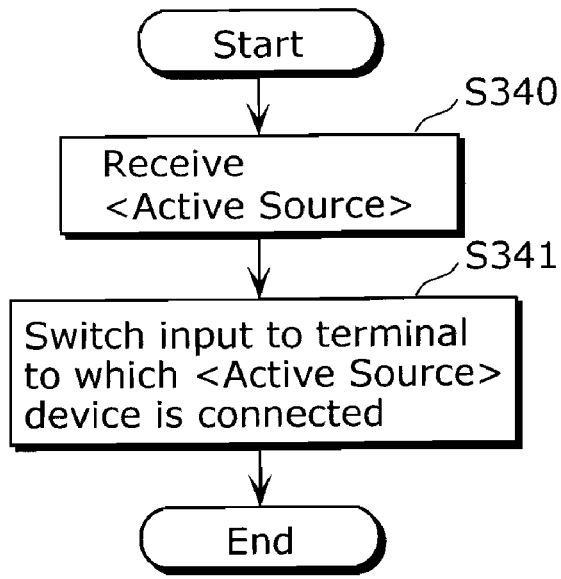
FIG. 29 is a flowchart showing the operation of the television in the third embodiment of the present invention.
Figure 30:
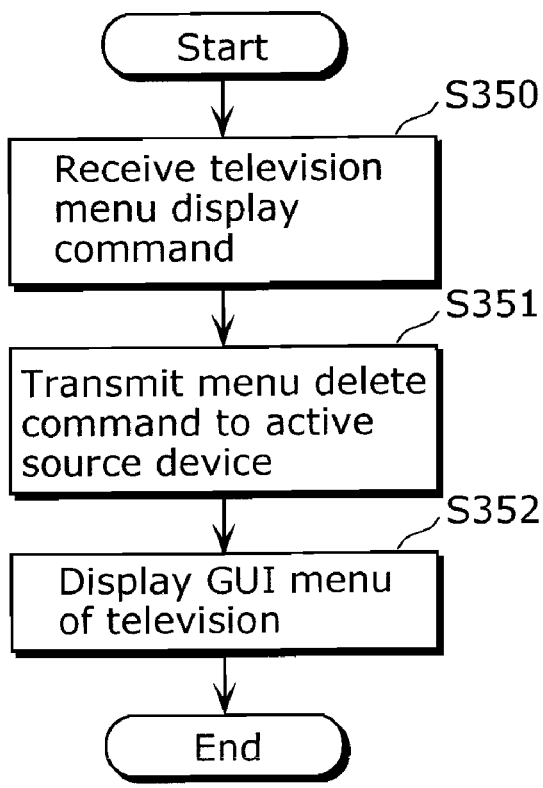
FIG. 30 is a flowchart showing the operation of the television in the third embodiment of the present invention.

FIG. 28 to FIG. 30 are flowcharts showing the operation of the television 203.

Upon receiving an <Active Source> command as shown in FIG. 29 (step S340), the television 203 records, in the memory 7, the device which is the transmission source of the command, as the active source device, shifts the input to the input terminal to which the active source device is connected, and displays the video supplied by the active source device, on the display 5 (step S341).

In the case where the user uses a function of the television 203 by operating the controller 4, the television 203 operates in the following manner. As shown in FIG. 30, upon receiving a command instructing the display of a television menu, transmitted from the set top box 2 in step S248 (step S350), the television 203 refers to the me instructing menu deletion, to the active source device (step S351, FIG. 24). Furthermore, the display 5 displays a menu generated by the microcomputer 8 such as that shown in FIG. 14, for example, by superimposition on the video currently being inputted (step S352, FIG. 24).

Furthermore, when the user operates the controller 4 so that a signal corresponding to a basic key is outputted from the controller 4, and the signal is received by the set top box 2 (basic key in step S242), the set top box 2 transmits CEC commands to the DVD player 1 which is the active source device, and to the television 203, in the same manner as in the operation described previously (step S246, FIG. 24).

The television 203 operates in the following manner in the case of receiving a command corresponding to a basic key (step S331).

In the case where the command received in step S311 is judged as a basic key in step S333 (basic key in step S333), the television 203 refers to the memory 7 and checks whether or not the television 203 is displaying a menu (step S335).

In the case where the television 203 is displaying a menu (displaying in step S335), the television 203 performs the operation corresponding to the command (step S336). For example, in the case where the received command is a command corresponding to the UP key included in the basic keys, the television 203 moves the cursor for the menu generated by the microcomputer 8 one item up. Furthermore, for example, in the case where the received command is for the ENTER key included in the basic keys, the television 203 executes the function corresponding to the item on which the cursor for the menu generated by the microcomputer 8 is focused.

Furthermore, in the case where the command received in step S331 is a command other than that of a basic key (other than basic key in step S333), the television 203 executes the operation corresponding to the command (step S334).

(Operation when Operating the DVD Recorder 205)

The user can also operate the DVD recorder 205 using the controller 4, in the same manner as the DVD player 1.

Hereinafter, the flow of operation of the set top box 2, the television 203, and the DVD recorder 205 when the user operates the DVD recorder 205 using the controller 4 shall be described.

When the user is viewing the cable television broadcast received by the set top box, on the television 203, the user selects an item for operating the DVD recorder 205, such as an item displayed as "Operate DVD recorder" for example, by moving the cursor 42 of the menu 41 of the set top box 2 shown in FIG. 27, up and down using the controller 4, in the same manner as when operating the DVD player 1. For example, in a program corresponding to a menu item called "Operate DVD recorder", the microcomputer 16 of the set top box 2 transmits a CEC command for activating the DVD recorder 205, and transmits a CEC command instructing the start of DVD playback to the DVD recorder 205. Upon receiving a CEC command other than that of a basic key (other than basic key in step S113), the DVD recorder 205 receiving the CEC command performs the operation corresponding to the command, in the same manner as the DVD player 1 (step S115).

Furthermore, the user starts the playback of a DVD by operating a controller of the DVD recorder 205, which is not shown in the diagram (other than basic key in step S112 and step S113; and step S115).

Since the DVD recorder 205 becomes the active source when the playback is started in the operation in step S115 or step S116 (active source in step S118), the DVD recorder 205 broadcasts an <Active Source> command (step S119, FIG. 24). The television 3 receiving the <Active Source> command switches the video and audio input to the terminal to which the DVD recorder 205 is connected (step S341). Furthermore, the set top box 2 which receives the <Active Source> command issued in step S119 (step S250), stores, in the memory 17, the logical address of the device which is the transmission source of the command (step S251).

Next, when the user operates a basic key of the controller 4, a command corresponding to the basic key is transmitted from the set top box 2. Upon receiving the command transmitted in step S246, in the case where the DVD recorder 205 judges that the command is that of a basic key (basic key in step S113) and the DVD recorder 205 is displaying a menu, in the same manner as the DVD player 1 (displaying in step S114), the DVD recorder 205 performs the process corresponding to the command, in the same mariner as the DVD player 1 (step S115).

In the above-described third embodiment, through the performance of the series of operations by the respective devices, even when the video outputted by an AV device other than the set top box is being viewed on the television, it is possible to operate the television and the AV device by using the controller of the set top box. In other words, the set top box 2 transmits a command to the two devices, namely the television 203 and the active source; the television 203, the DVD player 1, and the DVD recorder 205 each judge, based on the state of their own apparatus, whether or not to execute the command transmitted from the set top box 2; and the command is executed only by the device which judges that it should execute the command. For example, the device which is currently displaying a menu executes the command, and the other devices do not execute the command. In order to prohibit the other devices from executing the command, the device which is currently displaying a menu transmits a CEC command instructing menu deletion. With this, the execution of the same command by two or more devices is eliminated, and thus it is possible to carry out the exclusive control of the device executing the command.

Note that embodiments disclosed are exemplifications of all points and are not restrictive. The scope of the present invention is indicated by the Claims and not by the aforementioned descriptions, and all modifications having the same meaning, and which are within the scope of the Claims are intended to be included in the present invention.

INDUSTRIAL APPLICABILITY

The present invention can be applied in a remote control system, and so on, in which plural devices, including a set top box, are connected through an HDMI cable.

The invention claimed is:

1. A remote control system for controlling plural devices connected to a bus, said remote control system comprising:
a first video output apparatus operated by a remote controller; and a second video output apparatus which transmits a first command to the devices connected to the bus, the first command indicating that said second video output apparatus is currently outputting video, wherein said first video output apparatus transmits a second command to said second video output apparatus, via the bus, in the case of receiving the first command, the second command corresponding to an operating signal transmitted from the remote controller, and said second video output apparatus receives the second command and executes a process corresponding to the second command.

2. The remote control system according to claim 1, further comprising a video display apparatus connected to the bus, wherein said first video output apparatus transmits a predetermined third command to said video display apparatus connected to the bus, whether or not the first command is received, and said video display apparatus receives the third command and executes a process corresponding to the third command.

3. The remote control system according to claim 2, wherein said video display apparatus is a television receiver having a menu display function, which transmits a fourth command indicating start of displaying menu to said first video output apparatus, when said video display apparatus displays a menu, said first video output apparatus further transmits the second command to said video display apparatus via the bus, whether or not the first command is received, when said first video output apparatus receives the fourth command, and said video display apparatus receives the second command and executes the process corresponding to the second command.

4. The remote control system according to claim 3, wherein said video display apparatus further transmits a fifth command indicating end of displaying menu to said first video output apparatus, when said video display apparatus hides the menu, and said first video output apparatus further transmits the second command to a transmission source of the first command, in the case of receiving the fifth command.

5. The remote control system according to claim 1, wherein, at the start of video output, said second video output apparatus transmits, to the plural devices connected to the bus, the first command indicating that said video output apparatus is currently outputting video.

6. The remote control system according to claim 1, wherein the bus is a Consumer Electronics Control (CEC) bus of a High-Definition Multimedia Interface (HDMI) cable, and the first through fourth commands are commands defined in the HDMI/CEC standard.

7. The remote control system according to claim 1, wherein there is one or more of the second command, and each second command is associated with a corresponding one of one or more operating signals transmitted from the remote controller.

8. A video output apparatus connected, via a bus, to another video output apparatus transmitting a first command indicating that the another video output apparatus is currently outputting video, said video output apparatus comprising a control unit operated by a remote controller, and configured to transmit a second command to said another video output apparatus, via the bus, in the case of receiving the first command, the second command corresponding to an operating signal transmitted from the controller and corresponding to a process to be executed in said another video output apparatus.

9. A video display apparatus connected, via a bus, to a first video output apparatus and a second video output apparatus, wherein the second video output apparatus transmits a first command to the first video output apparatus and said video display apparatus which are connected to the bus, the first command indicating that the second video output apparatus is currently outputting video, the first video output apparatus is controlled by a remote controller, and transmits a third command to said video display apparatus connected to the bus, whether or not the first command is received, the third command corresponding to a process to be executed in the video output apparatus, and said video display apparatus comprises a control unit configured to receive the third command and execute a process corresponding to the third command.

10. A remote control method for controlling plural devices connected to a bus, wherein the plural devices include:

a first video output apparatus operated by a remote controller; and a second video output apparatus which transmits a first command to the plural devices connected to the bus, the first command indicating that the second video output apparatus is currently outputting video, and said remote control method comprises:

transmitting the first command to the first video output apparatus, performed by the second video output apparatus;

transmitting a second command to the second video output apparatus via the bus, in the case of receiving the first command, the second command corresponding to an operating signal transmitted from the remote controller, and said transmitting being performed by the first video output apparatus, and receiving the second command and executing a process corresponding to the second command, performed by the second video output apparatus.

11. A remote control system comprising a first video output apparatus having a remote controller, a video display apparatus, and at least one second video output apparatus that are connected to a bus, and which receives a command issued from the remote controller and transfers the received command, via the bus, to at least one of said video display apparatus and said at least one second video apparatus, wherein said first video output apparatus includes:

a recognition unit configured to recognize that said at least one second video output apparatus is in an operational state, based on a state-recognition command received from said at least one second video output apparatus, via the bus, the state-recognition command indicating that said at least one second video output apparatus is in an operational state, a classification unit configured to classify the command issued from the remote controller; and a transfer unit configured:

in the case where said classification unit classifies the command as a dedicated command for said video display apparatus, to transfer the dedicated command to said video display apparatus; and in the case where said classification unit classifies the command as a common command which can be run commonly among plural devices connected to the bus, to transfer, via the bus, to said video display apparatus and said at least one second video output apparatus that is in the operational state, a command in which the common command is attached with a code indicating said video display apparatus as a transmission destination, and a command in which the common command is attached with a code indicating said at least one second video output apparatus that is in the operational state as the transmission destination.

12. The remote control system according to claim 11, wherein each of said at least one second video output apparatus includes:
a notification unit configured to notify, via the bus, the state-recognition command to said video display apparatus and said first video output apparatus, when said at least one second video output apparatus is in the operational state.

13. The remote control system according to claim 11, wherein said at least one second video output apparatus includes:
a classification unit configured to classify whether or not a command received from another device via the bus is a command addressed to said second video output apparatus, based on a state of said second video output apparatus; and
a command execution unit configured:
to execute the command received via the bus, in the case where said classification unit classifies the command as a command addressed to said second video output apparatus, and
to withhold execution of the command received via the bus, in the case where said classification unit classifies the command as being addressed to another device.

14. The remote control system according to claim 11, wherein said video display apparatus includes a recognition unit configured to recognize that said at least one second video output apparatus is in the operational state, based on the state-recognition command received from said at least one second video output apparatus, via the bus, the state-recognition command indicating that said at least one second video output apparatus is in the operational state.

15. The remote control system according to claim 11, wherein said video display apparatus includes:
a classification unit configured to classify whether or not a command received from another device via the bus is a command addressed to said second video output apparatus, based on a state of said second video output apparatus; and
a command execution unit configured:
to execute the command received via the bus, in the case where said classification unit classifies the command as a command addressed to said second video output apparatus, and
to withhold execution of the command received via the bus, in the case where said classification unit classifies the command as being addressed to another device.

16. A video output apparatus having a remote controller, which is connected, by a bus, to a video display apparatus and at least one other video output apparatus, and which receives a command issued from the controller and transfers the received command to at least one of the video display apparatus and the at least one other video output apparatus, via the bus, said video output apparatus comprising:
a recognition unit configured to recognize that the at least one other video output apparatus is in an operational state, based on a state-recognition command received from the at least one other video output apparatus, via the bus, the state-recognition command indicating that the at least one other video output apparatus is in the operational state;
a classification unit configured to classify the command issued from the remote controller; and
a transfer unit configured:
in the case where said classification unit classifies the command as a dedicated command for the video display apparatus, to transfer the dedicated command to the video display apparatus;
in the case where said classification unit classifies the command as a common command which can be run commonly among plural devices connected to the bus, to transfer, via the bus, to the video display apparatus and the at least one other video output apparatus that is in the operational state, a command in which the common command is attached with a code indicating the video display apparatus as a transmission destination, and a command in which the common command is attached with a code indicating the at least one other video output apparatus that is in the operational state as the transmission destination.

17. A command transfer method for use in a remote control system which includes a first video output apparatus having a remote controller, a video display apparatus, and at least one second video output apparatus that are connected to a bus, and which receives a command issued from the remote controller, and transfers the received command, via the bus, to at least one of said video display apparatus and said at least one second video apparatus, said command transfer method comprising:
notifying, via the bus, a state-recognition command to said video display apparatus and said first video output apparatus, performed by said at least one second video output apparatus when going into an operational state;
recognizing that the at least one second video output apparatus is in the operational state, based on the state-recognition command notified from the at least one second video output apparatus, via the bus, said recognizing being performed by the first video output apparatus;
classifying the command issued from the remote controller, performed by the first video output apparatus; and
one of the following transferring performed by the first video output apparatus:
in the case where the command is classified as a dedicated command for said video display apparatus, (i) transferring the dedicated command to said video display apparatus; and
in the case where the command is classified as a common command which can be run commonly among plural devices connected to the bus, (ii) transferring, via the bus, to the video display apparatus and the at least one second video output apparatus that is in the operational state, a command in which the common command is attached with a code indicating the video display apparatus as a transmission destination, and a command in which the common command is attached with a code indicating the at least one second video output apparatus that is in the operational state as the transmission destination.

* * * * *